(12) United States Patent
Koch et al.

(10) Patent No.: US 12,364,187 B2
(45) Date of Patent: Jul. 22, 2025

(54) SYSTEMS AND METHODS FOR CONTROL, MONITORING AND MAPPING OF AGRICULTURAL APPLICATIONS

(71) Applicant: CLIMATE LLC, Saint Louis, MO (US)

(72) Inventors: Justin Koch, Deer Creek, IL (US); Doug Sauder, Livermore, CA (US); Tim Sauder, Tremont, IL (US); Jakob Stuber, Tremont, IL (US)

(73) Assignee: CLIMATE LLC, Saint Louis, MO (US)

( * ) Notice: Subject to any disclaimer, the term of this patent is extended or adjusted under 35 U.S.C. 154(b) by 738 days.

(21) Appl. No.: 17/571,963

(22) Filed: Jan. 10, 2022

(65) Prior Publication Data
US 2022/0124969 A1 Apr. 28, 2022

Related U.S. Application Data

(63) Continuation of application No. 16/573,972, filed on Sep. 17, 2019, now Pat. No. 11,219,155, which is a
(Continued)

(51) Int. Cl.
*A01C 21/00* (2006.01)
*A01B 79/00* (2006.01)
(Continued)

(52) U.S. Cl.
CPC .......... *A01C 21/005* (2013.01); *A01B 79/005* (2013.01); *A01C 21/00* (2013.01);
(Continued)

(58) Field of Classification Search
CPC ....... A01C 21/00; A01C 21/005; A01B 79/00; A01B 79/005; A01B 79/02; G06F 16/28;
(Continued)

(56) References Cited

U.S. PATENT DOCUMENTS

| 5,870,689 A | 2/1999 | Hale et al. |
| 5,878,371 A * | 3/1999 | Hale ...................... A01C 7/105 |
| | | 702/5 |

(Continued)

FOREIGN PATENT DOCUMENTS

| EP | 1346623 | 9/2003 |
| JP | H04335390 | 11/2004 |

(Continued)

OTHER PUBLICATIONS

Androidtapp. Samsung Galaxy S3—Groupcast (Share Real-Time Presentations Over WiFi). 7,10,17-19,21,22,30 Jun. 20, 2012 (Jun. 20, 2012), available at https://1www.youtube.comiwatch?v=-yBlxJ2gTT8. (Cited in International Search Report for PCT/US2013/054506, dated Apr. 9, 2014.).

(Continued)

*Primary Examiner* — Russell Frejd
*Assistant Examiner* — Sara J Lewandroski
(74) *Attorney, Agent, or Firm* — Harness, Dickey & Pierce, P.L.C.

(57) ABSTRACT

Systems and methods are provided for monitoring an agricultural implement. An example method includes, as an agricultural implement traverses a field, transmitting command signals to an implement actuator of the agricultural implement, whereby the implement actuator implements operating parameters associated with prescription data for the field. The method also includes receiving, at a monitor device, raw as-applied data from an implement sensor associated with the implement actuator, processing the raw as-applied data into processed as-applied data, and storing the processed as-applied data in a memory. The method further includes rendering a map representing the processed as-applied data, where the rendered map includes one or more application map images indicative of the processed (Continued)

as-applied data over an image of at least part of the field, and then displaying the rendered map.

18 Claims, 20 Drawing Sheets

Related U.S. Application Data continuation of application No. 15/645,967, filed on Jul. 10, 2017, now Pat. No. 10,412,882, which is a continuation of application No. 14/420,863, filed as application No. PCT/US2013/054506 on Aug. 12, 2013, now Pat. No. 9,699,958.

(60) Provisional application No. 61/738,292, filed on Dec. 17, 2012, provisional application No. 61/682,074, filed on Aug. 10, 2012.

(51) Int. Cl.
  *G01C 15/00* (2006.01)
  *G06F 16/29* (2019.01)
  *G07C 5/08* (2006.01)
  *G09B 29/00* (2006.01)

(52) U.S. Cl.
  CPC ............ *G01C 15/00* (2013.01); *G06F 16/29* (2019.01); *G07C 5/085* (2013.01); *G09B 29/007* (2013.01)

(58) Field of Classification Search
  CPC .... G06F 16/284; G06F 16/285; G06F 16/287; G06F 16/29; G09B 29/006; G09B 29/007; G01C 15/00; G01C 15/002; G07C 5/08; G07C 5/0808; G07C 5/0816; G07C 5/0825; G07C 5/0841; G07C 5/085; G07C 5/0858; G07C 5/0866; G07C 5/0875; G07C 5/0883; G07C 5/0891; G07C 5/10; G07C 5/12
  See application file for complete search history.

(56) References Cited

U.S. PATENT DOCUMENTS

| | | | |
|---|---|---|---|
| 6,070,539 | A | 6/2000 | Flamme et al. |
| 6,079,340 | A * | 6/2000 | Flamme ................. A01C 7/105 111/178 |
| 6,389,999 | B1 | 5/2002 | Duello |
| 9,699,958 | B2 | 7/2017 | Koch et al. |
| 10,412,882 | B2 | 9/2019 | Koch et al. |
| 11,219,155 | B2 | 1/2022 | Koch et al. |
| 2004/0158403 | A1 | 8/2004 | Dabas |
| 2005/0159885 | A1* | 7/2005 | Nomura ................. H04L 9/0866 340/995.14 |
| 2009/0217058 | A1 | 8/2009 | Obereiner et al. |
| 2010/0010667 | A1* | 1/2010 | Sauder ..................... B60Q 1/26 345/440.2 |
| 2010/0180695 | A1 | 7/2010 | Sauder et al. |
| 2011/0295638 | A1 | 12/2011 | Hunt et al. |
| 2012/0050023 | A1 | 3/2012 | Sauder et al. |
| 2017/0303465 | A1 | 10/2017 | Koch et al. |

FOREIGN PATENT DOCUMENTS

| | | |
|---|---|---|
| WO | WO98/22887 | 5/1998 |
| WO | WO2008/086318 | 7/2008 |
| WO | WO2012/015957 | 2/2012 |
| WO | WO2012/094256 | 7/2012 |
| WO | WO2014/018717 | 1/2014 |

OTHER PUBLICATIONS

Flaminio. iPad 2 Video Mirroring with HDMI Adapter (Review). 2011, available at https://www.youtube.com/watch?18,19,22v=R1vhwpnyYgg. (Cited in International Search Report for PCT/US2013/054506, dated Apr. 9, 2014.).
U.S. Appl. No. 16/573,972, filed Sep. 17, 2019, Koch et al.
U.S. Appl. No. 15/645,967, filed Jul. 10, 2017, Koch et al.
U.S. Appl. No. 14/420,863, filed Feb. 10, 2015, Koch et al.
U.S. Appl. No. 16/573,972: (a) Office action dated May 28, 2021; and (b) Notice of Allowance dated Sep. 9, 2021. The instant application is a continuation of U.S. Appl. No. 16/662,017.
U.S. Appl. No. 15/645,967: (a) Office action dated Jul. 12, 2018; (b) Office action dated Feb. 6, 2019; and (c) Notice of Allowance dated May 9, 2019. The instant application has a priority claim related to U.S. Appl. No. 15/645,967.
U.S. Appl. No. 14/420,863: (a) Office action dated Oct. 24, 2016; (b) Notice of Allowance dated Feb. 21, 2017; and (c) Notice of Allowance dated Jun. 9, 2017. The instant application has a priority claim related to U.S. Appl. No. 14/420,863.
PCT/US2013/054506: (a) International Search Report and Written Opinion dated Apr. 9, 2014. The instant application has a priority claim related to PCT/US2019/057819.
AU 2013299359: (a) Examination Report dated May 16, 2018; and (b) Notice of Grant dated Jan. 3, 2019. The instant application and AU 2013299359 have related priority claims.
BR 112015002799-7: (a) Office Action dated Jan. 21, 2020; and (b) Office Action dated Dec. 14, 2021. The instant application and BR. 112015002799-7 have related priority claims.
CA 2,880,570: (a) Search Report dated Jun. 19, 2018; (b) Search Report dated Mar. 22, 2019; (c) Office Action dated Jan. 16, 2020; and (d) Examination Report dated Jun. 15, 2021. The instant application and CA 2,880,570 have related priority claims.
EP 13828446,8: (a) Search Report dated Jun. 16, 2016; (b) Search Report dated Mar. 23, 2017; and (c) Decision to Grant dated Mar. 1, 2018. The instant application and EP 13828446.8 have related priority claims.
EP 18159551.3: (a) Search Report dated Jun. 27, 2018; (b) Search Report dated Oct. 4, 2019; and (c) Decision to Grant dated Apr. 22, 2021. The instant application and EP 18159551.3 have related priority claims.
EP 21167413.0: Search Report dated Aug. 17, 2021. The instant application and EP 21167413.0 have related priority claims.
UA 201502061: (a) Search Report dated Sep. 4, 2017. The instant application and UA 201502061 have related priority claims.
UA 201710400: Decision to Grant dated Aug. 19, 2021. The instant application and UA201710400 have related priority claims.

* cited by examiner

SYSTEMS AND METHODS FOR CONTROL, MONITORING AND MAPPING OF AGRICULTURAL APPLICATIONS

CROSS-REFERENCE TO RELATED APPLICATIONS

This application is a Continuation of U.S. patent application Ser. No. 16/573,972, filed Sep. 17, 2019, which is a Continuation of U.S. patent application Ser. No. 15/645,967, filed Jul. 10, 2017, which is a Continuation of U.S. patent application Ser. No. 14/420,863, filed Feb. 10, 2015, which claims the benefit as a U.S. National Phase Application of International Application No. PCT/US2013/054506, filed Aug. 12, 2013, which claims the benefit of, and priority to, U.S. Provisional Application No. 61/738,292, filed Dec. 17, 2012, and U.S. Provisional Application No. 61/682,074, filed Aug. 10, 2012, the entire contents of all of which are hereby incorporated by reference as if fully set forth herein. The applicant hereby rescinds any disclaimer of claim scope in the parent applications or the prosecution history thereof and advises the USPTO that the claims in this application may be broader than any claim in the parent applications.

BACKGROUND

In recent years, the price of crop inputs and the increased availability of spatial mapping of agricultural operations have revealed the need for improved monitoring techniques to improve operator and grower decision-making based on spatial variations in farming practices. Thus there is a need in the art for improved methods of controlling, monitoring and mapping agricultural applications.

DRAWINGS

FIG. 1 schematically illustrates an embodiment of a monitor system and data transmission between components of the monitor system.

DESCRIPTION

Monitor System Overview

Figure 1:
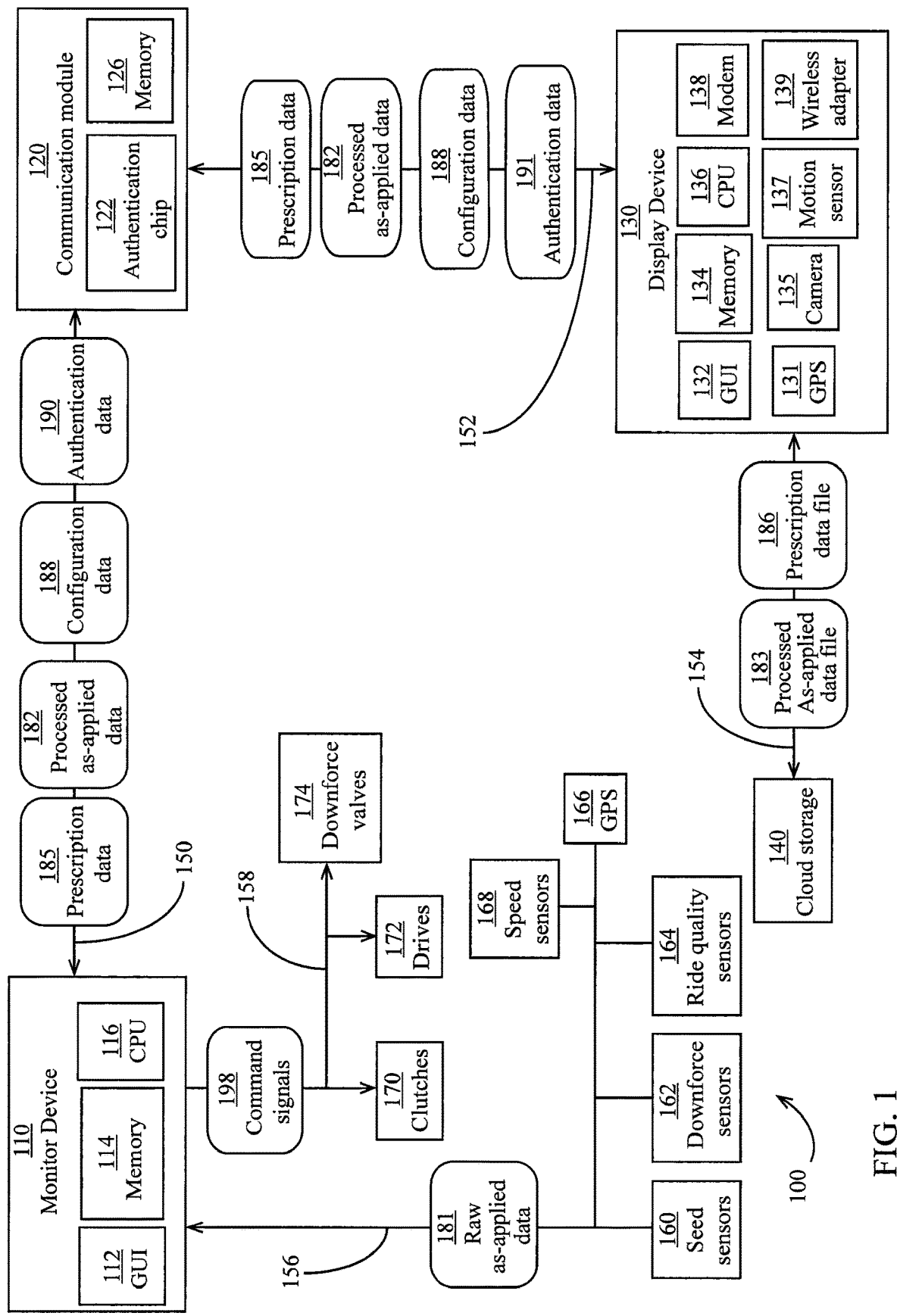

Referring now to the drawings, wherein like reference numerals designate identical or corresponding parts throughout the several views, FIG. 1 illustrates an embodiment of a monitor system 100. The monitor system 100 preferably includes a monitor device 110, a communication module 120, and a display device 130. The monitor device 110 preferably includes a graphical user interface (GUI) 112, memory 114, and a central processing unit (CPU) 116. The monitor device 110 is in electrical communication with the communication module 120 via a harness 150. The communication module 120 preferably includes an authentication chip 122 and memory 126. The communication module 120 is in electrical communication with the display device 130 via a harness 152. The display device 130 preferably includes a GUI 132, memory 134, a CPU 136 and a wireless Internet connection means 154 for connecting to a "cloud" based storage server 140. One such wireless Internet connection means 154 may comprise a cellular modem 138. Alternatively, the wireless Internet connection means 154 may comprise a wireless adapter 139 for establishing an Internet connection via a wireless router.

The display device 130 may be a consumer computing device or other multi-function computing device. The display device 130 preferably includes general purpose software including an Internet browser. The display device 130 also preferably includes a motion sensor 137, such as a gyroscope or accelerometer, and preferably uses a signal generated by the motion sensor 137 to determine a desired modification of the GUI 132. The display device 130 also preferably includes a digital camera 135 whereby pictures taken with the camera 135 may be associated with a global positioning system (GPS) position, stored in the memory 134 and transferred to the cloud storage server 140. The display device 130 also preferably includes a GPS receiver 131.

The monitor device 110 is preferably in electrical communication with seed sensors 160, downforce sensors 162, ride quality sensors 164, a GPS receiver 166, and one or more speed sensors 168 via a harness 156. The monitor device 110 is preferably in electrical communication with clutches 170, drives 172, and downforce valves 174 via a harness 158.

Figure 2A:
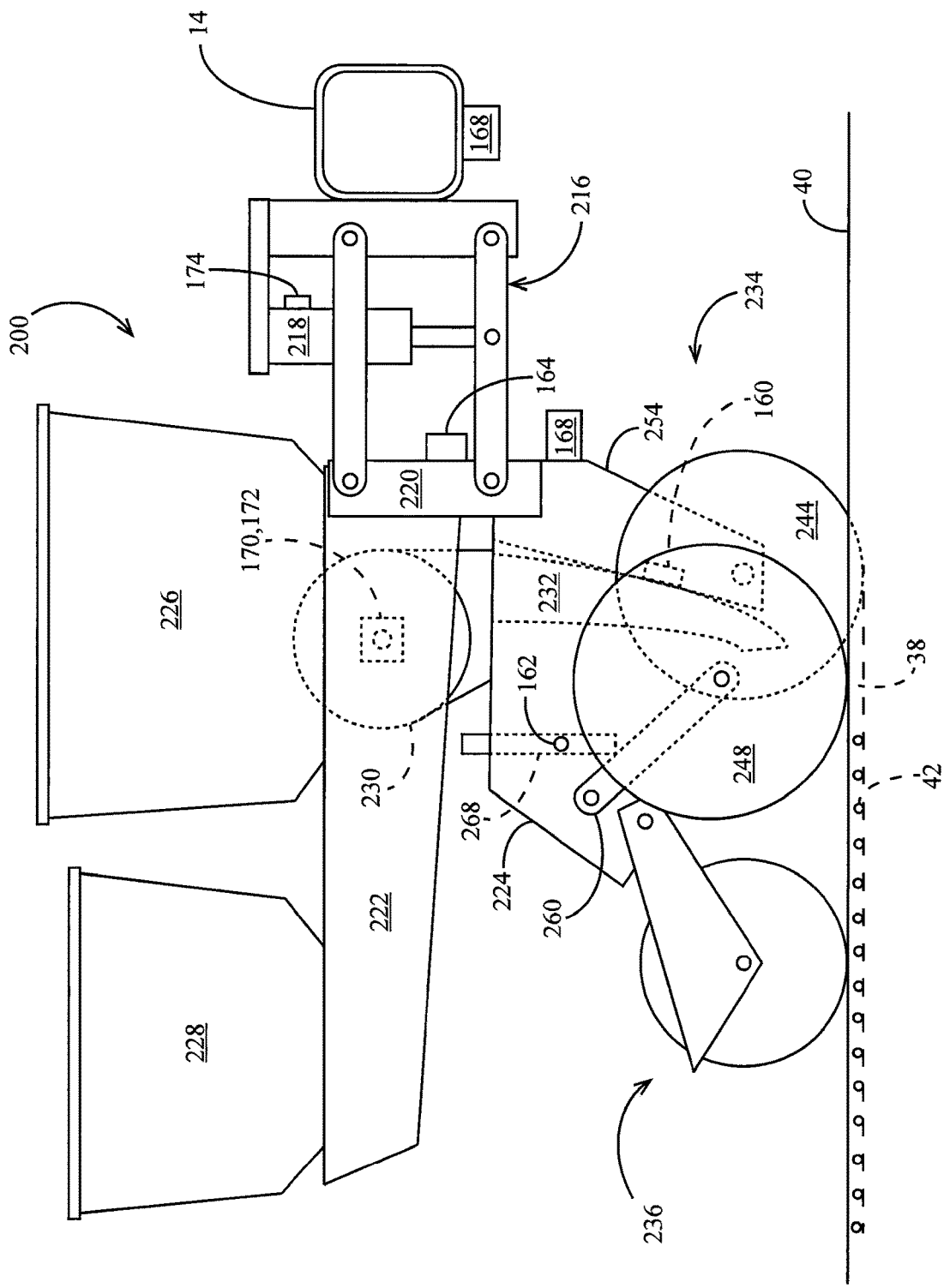
FIG. 2A is a side elevation view of an embodiment of a row unit with components of the monitor system of FIG. 1.
Figure 2B:
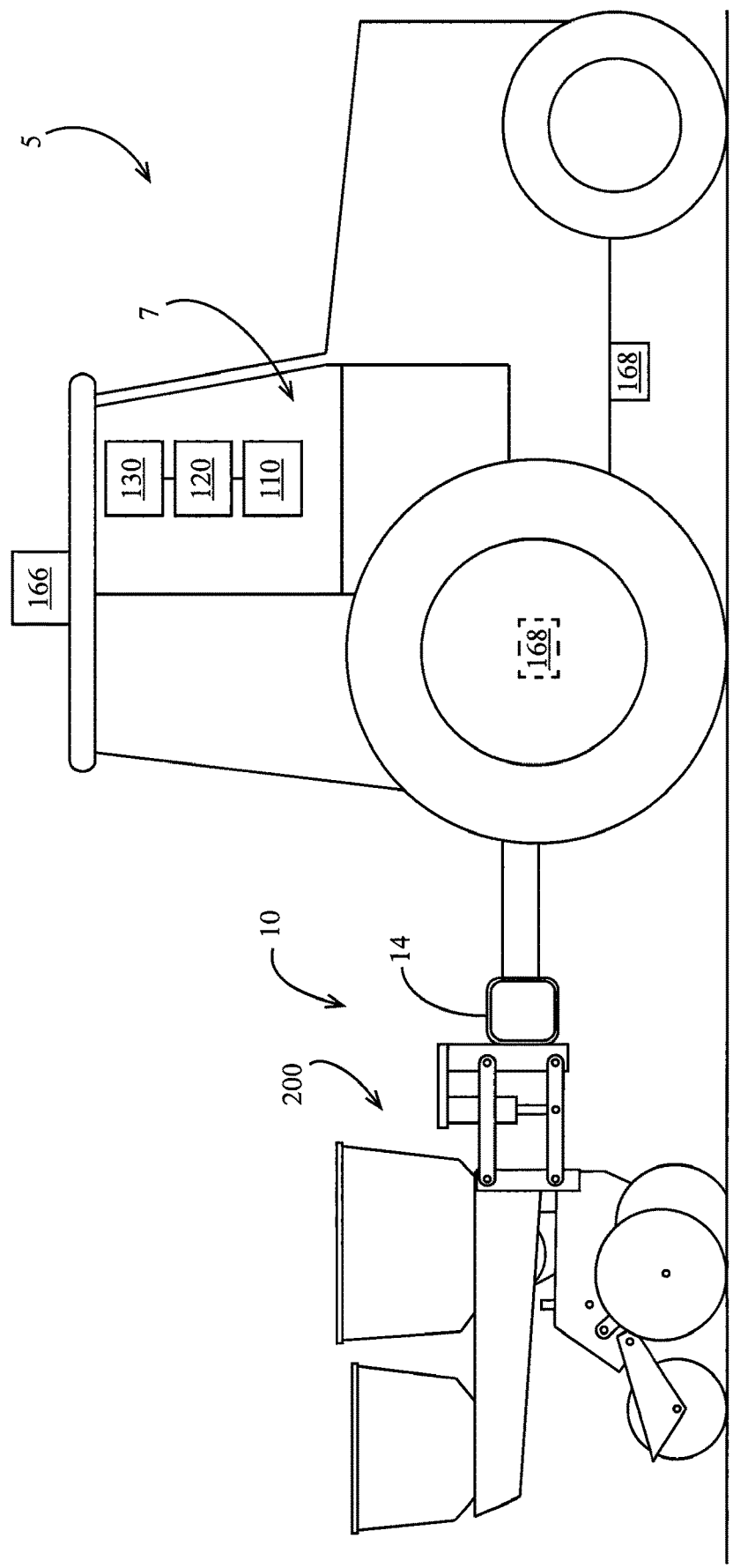
FIG. 2B is a side elevation view of a tractor and planter with the row unit of FIG. 2A and other components of the monitor system of FIG. 1.

Turning to FIGS. 2A and 2B, an embodiment of the monitor system 100 is illustrated integrated on a planter 10 drawn by a tractor 5. The planter 10 includes a transversely extending toolbar 14 to which multiple row units 200 are mounted.

Referring to FIG. 2A, each row unit 200 is supported from the toolbar 14 by a parallel linkage 216 which permits each row unit to move vertically independently of the toolbar and the other spaced row units in order to accommodate changes in terrain or upon the row unit encountering a rock or other obstruction as the planter is drawn through the field. The ride quality sensor 164, preferably an accelerometer, is mounted to the row unit 200 and disposed to measure the vertical velocity and acceleration of the row unit 200. Speed sensors 168, such as radar speed sensors or GPS speed sensors, are preferably mounted to the toolbar 14 or to the row unit 200. A downforce actuator 218, such as an air bag, hydraulic or pneumatic cylinder or the like, acts on the parallel linkage 16 to exert a downforce on the row unit. The downforce valve 174, such as an electrically operated servo valve, controls the amount of downforce applied by the downforce actuator 218. Each row unit 200 further includes a front mounting bracket 220 to which is mounted a hopper support beam 222 and a subframe 224. The hopper support beam 222 supports a seed hopper 226 and a fertilizer hopper 228 as well as operably supporting a seed meter 230 and a seed tube 232. The subframe 224 operably supports a furrow opening assembly 234 and a furrow closing assembly 236.

In operation of the planter 10, the furrow opening assembly 234 of the row unit 200 cuts a furrow 38 into the soil surface 40 as the planter 10 is drawn through the field. The seed hopper 226, which holds the seeds to be planted, communicates a constant supply of seeds 42 to the seed meter 230. In some embodiments the planter 10 is a central-fill planter including a frame-mounted bulk hopper as is known in the art; in such embodiments the seed hopper 226 preferably comprises a small auxiliary hopper in seed communication with the bulk hopper. The seed meter 230 of each row unit 200 is preferably selectively engaged to the drive 172 via the clutch 170 such that individual seeds 42 are metered and discharged into the seed tube 232 at regularly spaced intervals based on the seed population desired and the speed at which the planter is drawn through the field. The drive 172 and clutch 170 may be of the types disclosed in Applicant's U.S. patent application Ser. No. 12/228,075 incorporated herein in its entirety by reference. In other embodiments, the clutch 170 is omitted and the drives 172 comprise electric drives such as those disclosed in Applicant's International Patent Application No. PCT/US2013/051971, incorporated herein in its entirety by reference. The seed sensor 160, preferably an optical sensor, is supported by the seed tube 232 and disposed to detect the presence of seeds 42 as they pass. The seed 42 drops from the end of the seed tube 232 into the furrow 38 and the seeds 42 are covered with soil by the closing wheel assembly 236.

The furrow opening assembly 234 preferably includes a pair of furrow opening disk blades 244 and a pair of gauge wheels 248 selectively vertically adjustable relative to the disk blades 244 by a depth adjusting mechanism 268. The depth adjusting mechanism 268 preferably pivots about the downforce sensor 162, which preferably comprises a pin instrumented with strain gauges for measuring the force exerted on the gauge wheels 248 by the soil 40. The downforce sensor 162 is preferably of the type disclosed in Applicant's U.S. patent application Ser. No. 12/522,253, incorporated herein in its entirety by reference. In other embodiments, the downforce sensor is of the types disclosed in U.S. Pat. No. 6,389,999, incorporated herein in its entirety by reference. The disk blades 244 are rotatably supported on a shank 254 depending from the subframe 224. Gauge wheel arms 260 pivotally support the gauge wheels 248 from the subframe 224. The gauge wheels 248 are rotatably mounted to the forwardly extending gauge wheel arms 260.

Referring to FIG. 2B, the GPS receiver 166 is preferably mounted to an upper portion of the tractor 5. The display device 130, communication module 120, and monitor device 110 are mounted in a cab 7 of the tractor 5. One or more speed sensors 168, such as a hall-effect wheel speed sensor or a radar speed sensor, are preferably mounted to the tractor 5.

Monitor System Operation

Figure 12:
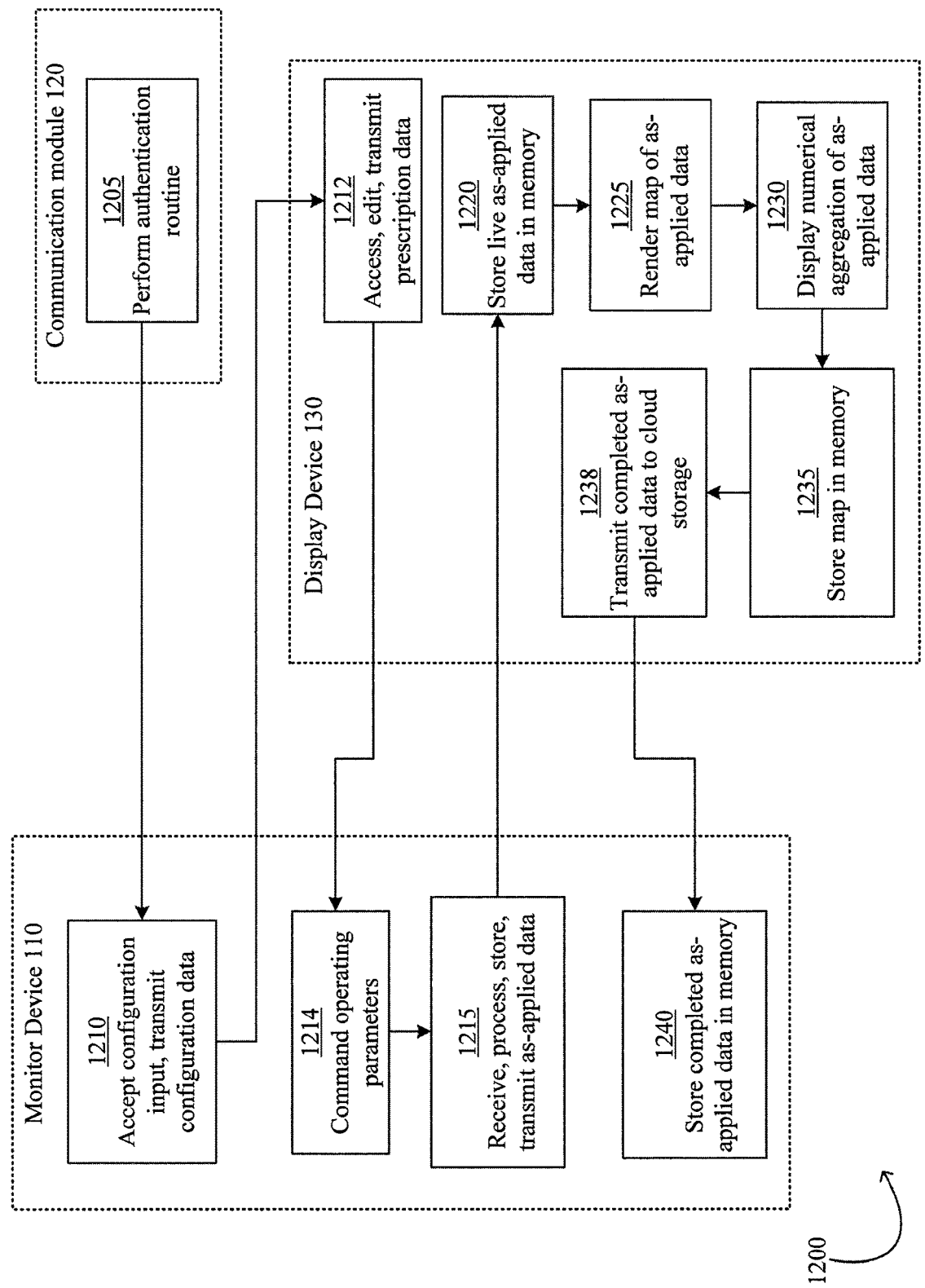
FIG. 12 illustrates an embodiment of a process for setting up a monitor system, controlling an implement, and storing and mapping operational data.

In operation, the monitor system 100 of FIG. 1 preferably carries out a process designated generally by reference numeral 1200 in FIG. 12. Referring to FIG. 12 in combination with FIG. 1, at step 1205, the communication module 120 preferably performs an authentication routine in which the communication module 120 receives a first set of authentication data 190 from the monitor device 110 and the authentication chip 122 compares the authentication data 190 to a key, token or code stored in the memory 126 of the communication module 120 or which is transmitted from the display device 130. If the authentication data 190 is correct, the communication module 120 preferably transmits a second set of authentication data 191 to the display device 130 such that the display device 130 permits transfer of other data between the monitor device 110 and the display device 130 via the communication module 120 as indicated in FIG. 1.

At step 1210, the monitor device 110 accepts configuration input entered by the user via the GUI 112. In some embodiments, the GUI 112 may be omitted and configuration input may be entered by the user via the GUI 132 of the display device 130. The configuration input comprises parameters preferably including dimensional offsets between the GPS receiver 166 and the seed tubes 232 and operational parameters of the clutches 170, drives 172 and downforce valves 174. The monitor device 110 then transmits the resulting configuration data 188 to the display device 130 via the communication module 120 as indicated in FIG. 1.

At step 1212, the display device 130 preferably accesses prescription data file 186 from the cloud storage server 140. The prescription data file 186 preferably includes a file (e.g., a shape file) containing geographic boundaries (e.g., a field boundary) and relating geographic locations (e.g., GPS coordinates) to operating parameters (e.g., seed planting rates). The display device 130 preferably allows the user to edit the prescription data file 186 using the GUI 132. The display device 130 preferably reconfigures the prescription data file 186 for use by the monitor device 110 and transmits resulting prescription data 185 to the monitor via the communication module 120.

At step 1214, as the planter 10 is drawn through the field, the monitor device 110 sends command signals 198 to the clutches 170, drives 172 and downforce valves 174. Command signals 198 preferably include signals determining whether one or more clutches 170 are engaged, signals determining the rate at which drives 172 are driven, and signals determining the downforce set by downforce valves 174.

At step 1215, as the planter 10 is drawn through the field, the monitor device 110 receives raw as-applied data 181 including signals from seed sensors 160, downforce sensors 162, ride quality sensors 164, GPS receiver 166 and seed sensors 168. The monitor device 110 preferably processes the raw as-applied data 181, and stores the as-applied data to the memory 114. The monitor 130 preferably transmits processed as-applied data 182 to the display device 130 via the communication module 120. The processed as-applied data 182 is preferably streaming, piecewise, or partial data.

It should be appreciated that according to the method 1200, implement control and data storage are performed by the monitor device 110 such that if the display device 130 stops functioning, is removed from the monitor system 100, or is used for other functions, the implement operations and essential data storage are not interrupted.

At step 1220, the display device 130 receives and stores the live processed as-applied data 182 in the memory 134. At step 1225, the display device 130 preferably renders a map of the processed as-applied data 182 (e.g., a population map) as described more fully elsewhere herein. The map preferably includes a set of application map images superimposed on an aerial image. At step 1230, the display device 130 preferably displays a numerical aggregation of as-applied data (e.g., population planted by a row unit over the last 5 seconds). At step 1235, the display device 130 preferably stores the location, size and other display characteristics of the application map images rendered at step 1225 in the memory 134. At step 1238, after completing planting operations, the display device 130 preferably transmits processed as-applied data file 183 to the cloud storage server 140. Processed as-applied data file 183 is preferably a complete file (e.g., a data file). At step 1240 the monitor device 110 preferably stores completed as-applied data (e.g., in a data file) in the memory 114.

Mapping and Display Methods

Figure 4:
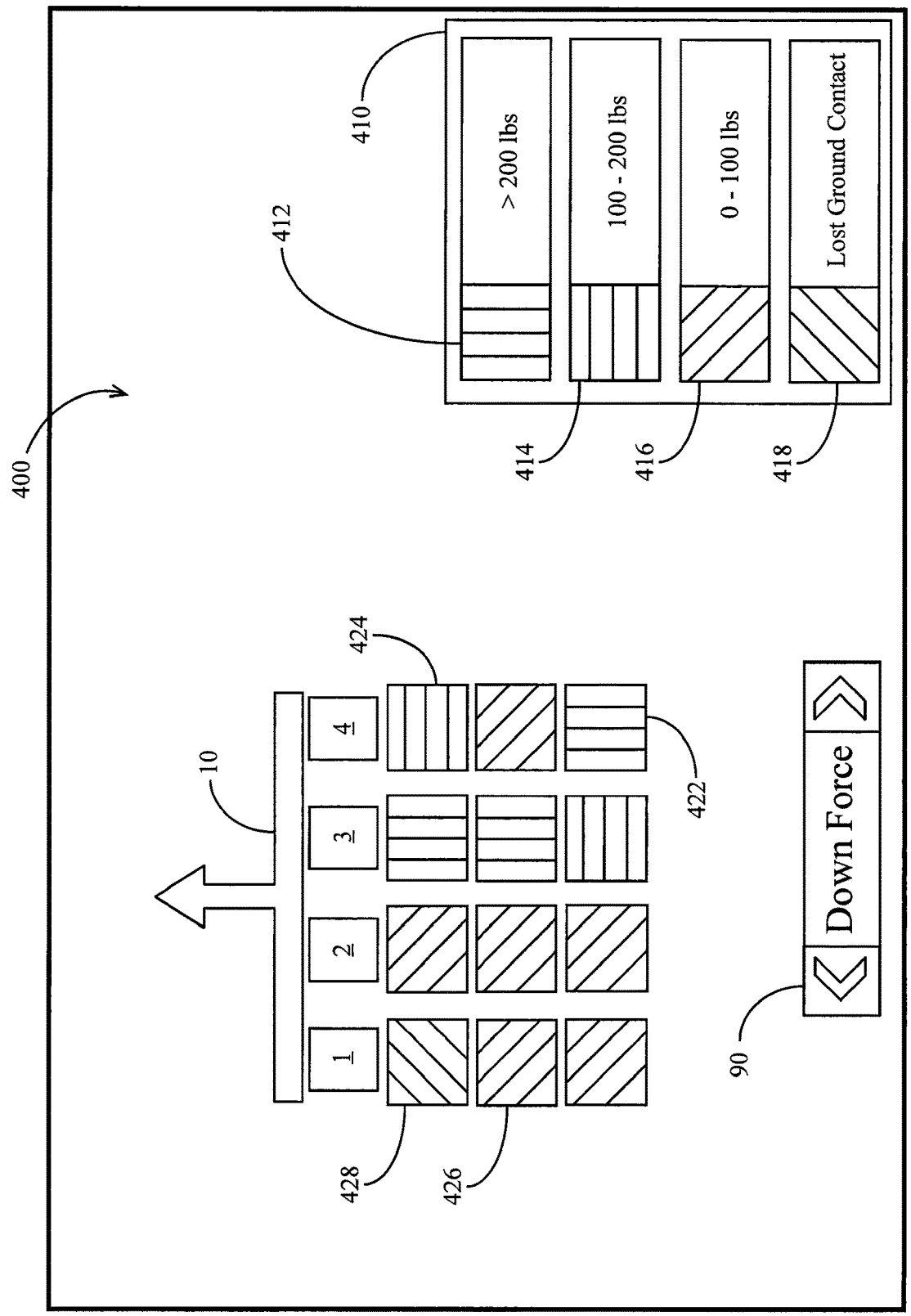
FIG. 4 illustrates an embodiment of a downforce and ground contact map.

The monitor system 100 preferably displays a downforce map 400 as illustrated in FIG. 4. The downforce map 400 preferably includes a schematic representation of the location of planter 10 and its transversely-spaced row units (e.g., row units 1-4). As the planter 10 traverses the field, a map block (e.g., map block 428) is placed in the location occupied by each row unit 1-4. The pattern, symbol or color of each map block corresponds to a legend 410 preferably displayed in the downforce map 400. The legend 410 preferably includes a set of legend ranges (e.g., legend ranges 412, 414, 416, 418) including, for example, a pattern, symbol or color and a corresponding value range. In the case of legend range 418, the pattern corresponds to a ground contact parameter range while the patterns of legend ranges 412, 414, 416 correspond to downforce ranges as discussed below. It should be appreciated that the legend ranges 412, 414, 416, 418 correspond to map blocks 422, 424, 426, 428, respectively. An interface 90 allows the user to select which map (e.g., downforce map 400) is currently displayed on the screen.

Figure 3:
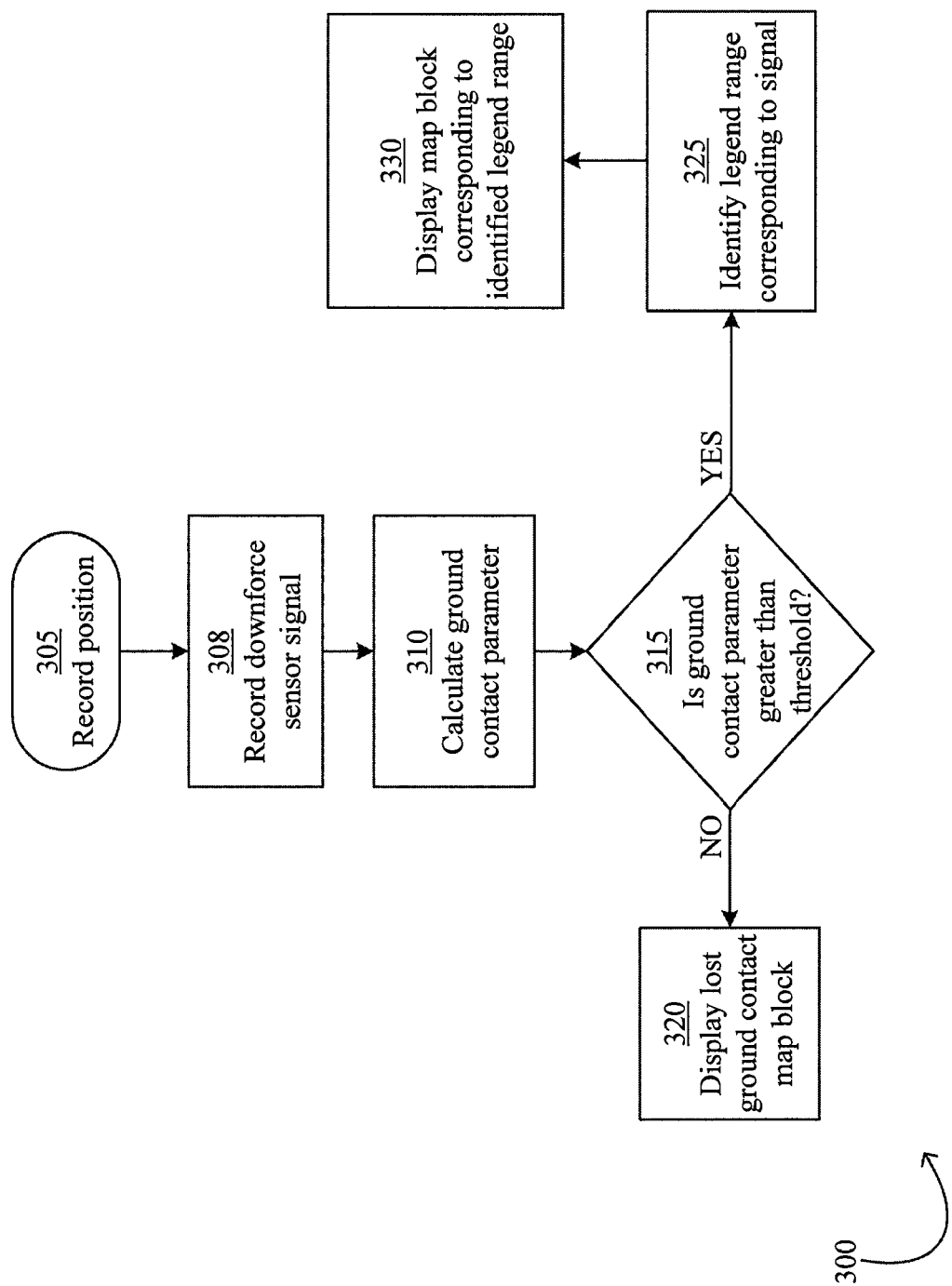
FIG. 3 illustrates an embodiment of a process for generating a map of downforce and ground contact.

The monitor system 100 preferably displays the downforce map 400 according to a process designated generally by reference numeral 300 in FIG. 3. At step 305, the monitor device 110 records the position reported by the GPS receiver 166 and determines the position of each row unit. At step 308, the monitor device 110 records the signal generated by the downforce sensors 162. At step 310, the monitor device 110 uses the downforce signal to calculate a ground contact parameter related to the consistency of full depth penetration by the opener discs 244 (e.g., by calculating a percentage of time during a predefined sampling period in which the downforce signal is greater than a threshold such as zero). At step 315, the display device 130 preferably determines whether the ground contact parameter is greater than a threshold value. If the ground contact parameter is not greater than the threshold value, then at step 320 the display device 130 preferably displays a lost ground contact block 428. If the ground contact parameter is greater than the threshold value, then at step 325 the display device 130 preferably identifies the legend range corresponding to the downforce signal (e.g., if the signal level is 50 lbs, the display identifies legend range 416). At step 330, the display device 130 displays a map block corresponding to the identified legend range (e.g., if legend range 416 is identified, map block 426 is displayed).

Figure 5:
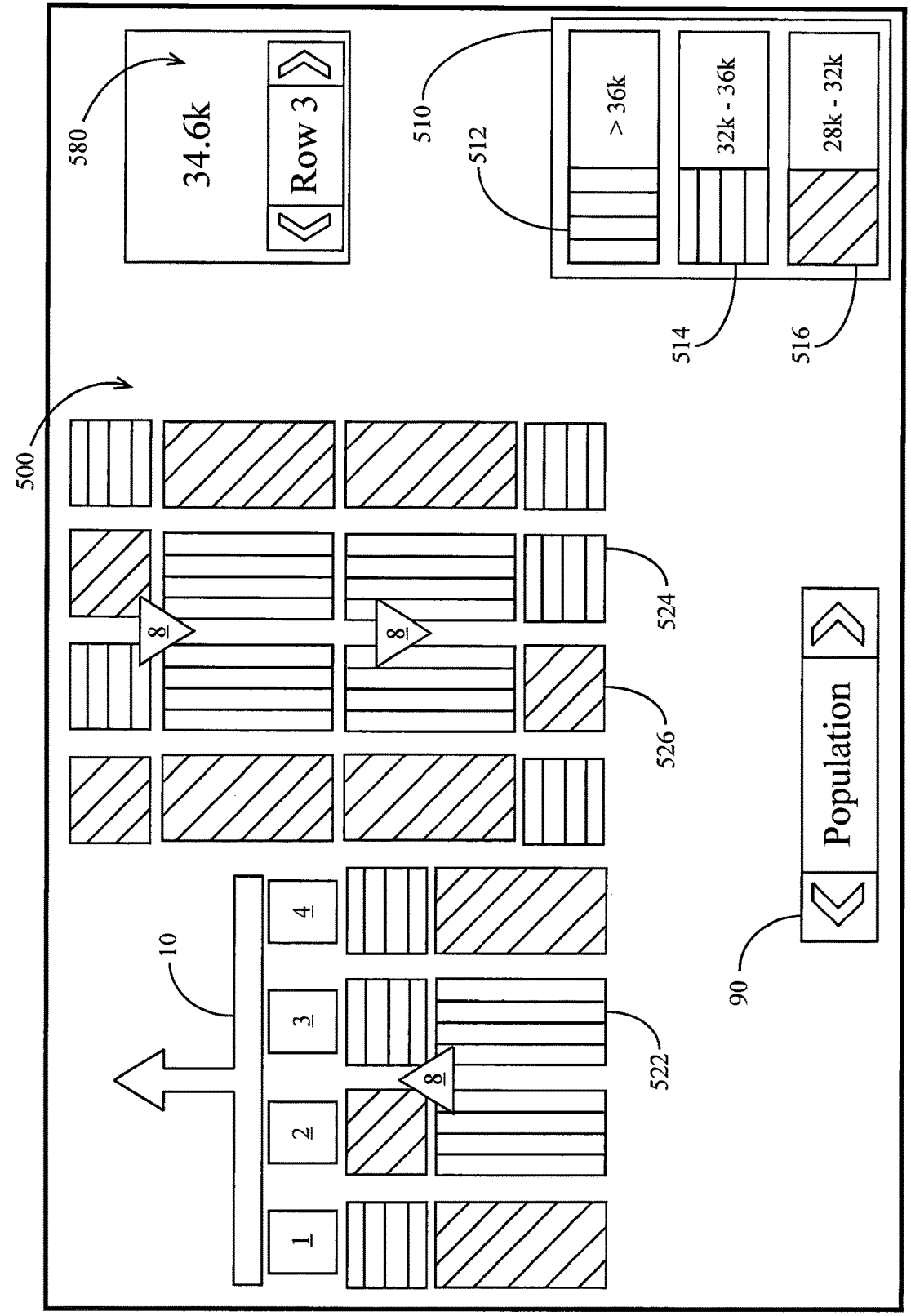
FIG. 5 illustrates an embodiment of a population map.

The monitor system 100 preferably displays a population map 500 an embodiment of which is illustrated in FIG. 5. The population map 500 preferably includes a schematic representation of the location of planter 10 and its transversely-spaced row units (e.g., row units 1-4). As the planter 10 traverses the map, a map block (e.g., map block 522) is placed in the location occupied by each row unit 1-4. The pattern, symbol or color of each map block corresponds to a legend 510 preferably displayed in the population map 500. The legend 510 preferably includes a set of legend ranges (e.g., legend ranges 512, 514, 516) including a pattern, symbol or color and a corresponding value range. The legend ranges 512, 514, 516 correspond to population ranges as discussed below. It should be appreciated that the legend ranges 512, 514, 516 correspond to map blocks 522, 524, 526, respectively. The population map 500 preferably includes an aggregate interface 580 displaying the aggregate population (e.g., the population planted over the last 5 seconds) by an individual row or the entire planter and allowing the user to select the row (e.g., row 3 in FIG. 5) for which the aggregate population is displayed. The population map 500 also preferably displays multiple direction images 8 indicating the direction of the planter 10. The direction images 8 are preferably superimposed over or adjacent to one or more map blocks (e.g., map block 522) and indicate the direction of the planter 10 at the time the superimposed or adjacent map blocks were placed.

Figure 6:
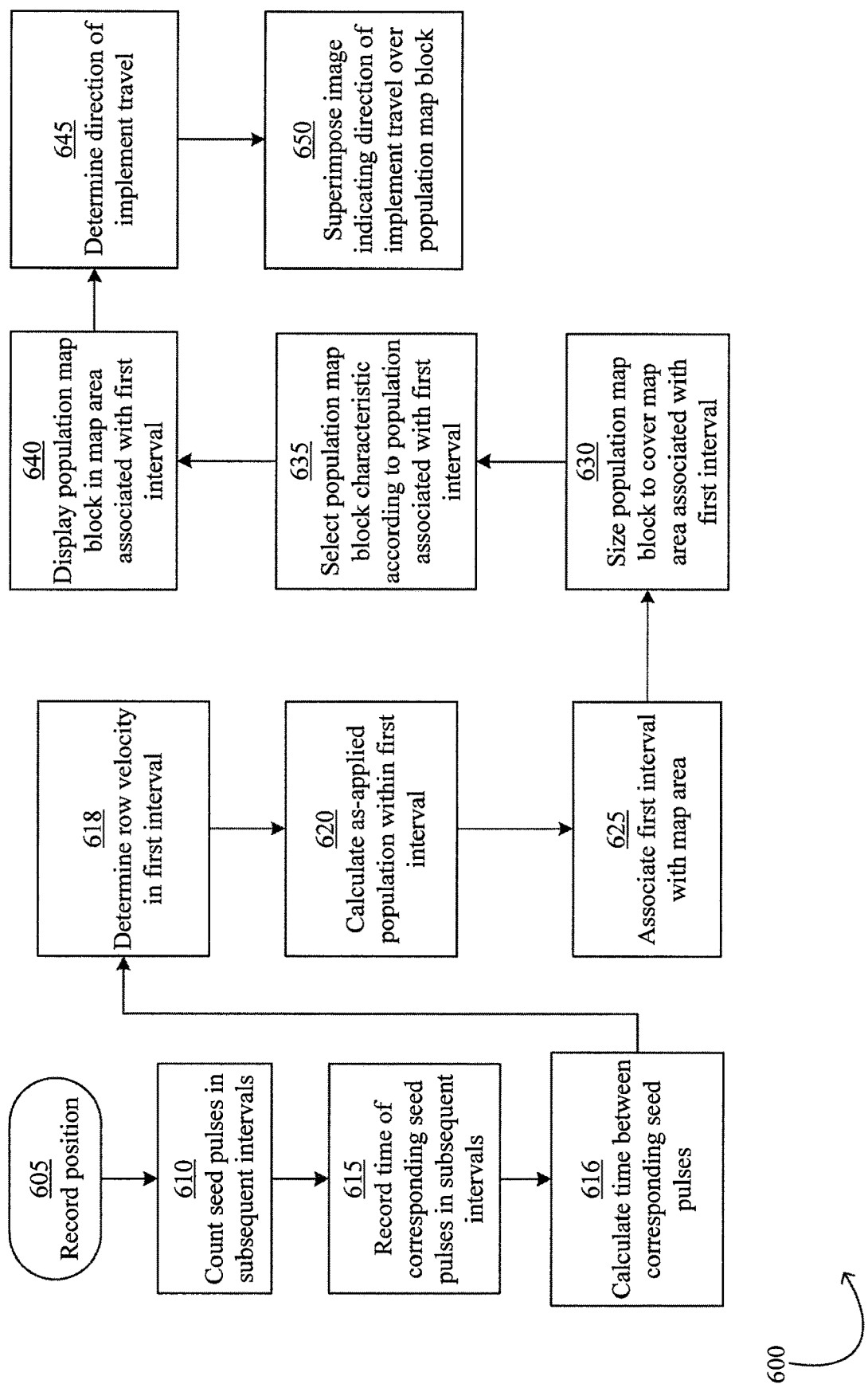
FIG. 6 illustrates an embodiment of a process for generating a population map.

The monitor system 100 preferably displays the population map 500 according to an embodiment of a process designated generally by reference numeral 600 in FIG. 6. At step 605, the monitor device 110 records the position reported by the GPS receiver 166 and determines the position of each row unit. At step 610, the monitor device 110 preferably counts the number of seed pulses (predefined changes in value or slope of the signal generated by each seed sensor 160) in multiple intervals (e.g., one-second intervals). At step 615, the monitor device 110 preferably stores the time of corresponding seed pulses in multiple intervals (e.g., the time of the last seed pulse in each interval). At step 616, the monitor device 110 preferably calculates the time between the corresponding seed pulses in each subsequent interval. At step 618, the monitor device 110 preferably determines the row velocity of each row during the first interval (e.g., by averaging all row velocity measurements during the first interval). In some embodiments, the monitor device 110 assumes the row velocity of each row is equal to the speed reported by a speed sensor 168 mounted to the tractor along the direction of travel. In other embodiments, the monitor device 110 calculates a row-specific velocity more accurately (e.g., when executing turns) using one or more speed sensors 168 mounted to the toolbar 14 or to one or more row units 200. At step 620, the monitor device 110 calculates the as-applied population within a first interval, preferably using the following formula:

$$\text{Population} = \frac{SeedCount}{\text{Spacing (ft)} \times \text{Time}(s) \times \text{Speed}\left(\frac{ft}{s}\right)} \times 43500 \frac{ft^2}{acre}$$

Where:
SeedCount=Number of seeds counted at the row during instant interval.
Spacing=Planter row spacing included in the configuration data.

Time=Time between corresponding seed pulses from instant interval and prior interval.

Speed=Magnitude of row velocity.

Continuing to refer to FIG. 6, at step 625 the display device 130 preferably associates the first interval with a map area (e.g., using one or more positions reported by the GPS receiver 166 during the first interval). At step 630, the display device 130 preferably determines a size of a population map block to cover the map area associated with the first interval (e.g., a rectangle having a length corresponding to the positions reported by the GPS receiver 166 at the beginning and end of the first interval, and having a width equal to the planter row spacing). Thus it should be appreciated that for each row unit, each interval is associated with a map block.

With reference to FIG. 5, it should be appreciated that the length of the population map blocks may vary depending on the row unit velocity during each interval. At step 635, the display device 130 preferably selects a population image characteristic (e.g., a pattern, symbol or color) based on the legend range in legend 510 associated with the population calculated for the first interval (e.g., population map block 522 has a calculated population of 36,500 seeds per acre and thus has a pattern corresponding to legend range 512). At step 640, the display device 130 preferably displays the population map block in the map area associated with the first interval. At step 645, the display device 130 determines the direction of implement travel during the first interval (e.g., by determining the direction of a line between the position during the first interval and the position during a prior interval). At step 650 the display device 130 preferably displays an image (e.g., direction images 8 in FIG. 5) indicating the direction of travel. Each direction image is preferably superimposed over one or more population map blocks associated with the first interval. It should be appreciated that the direction images 8 assist the user in determining which planter row unit planted each row when reviewing the map after planting operations.

Figure 7:
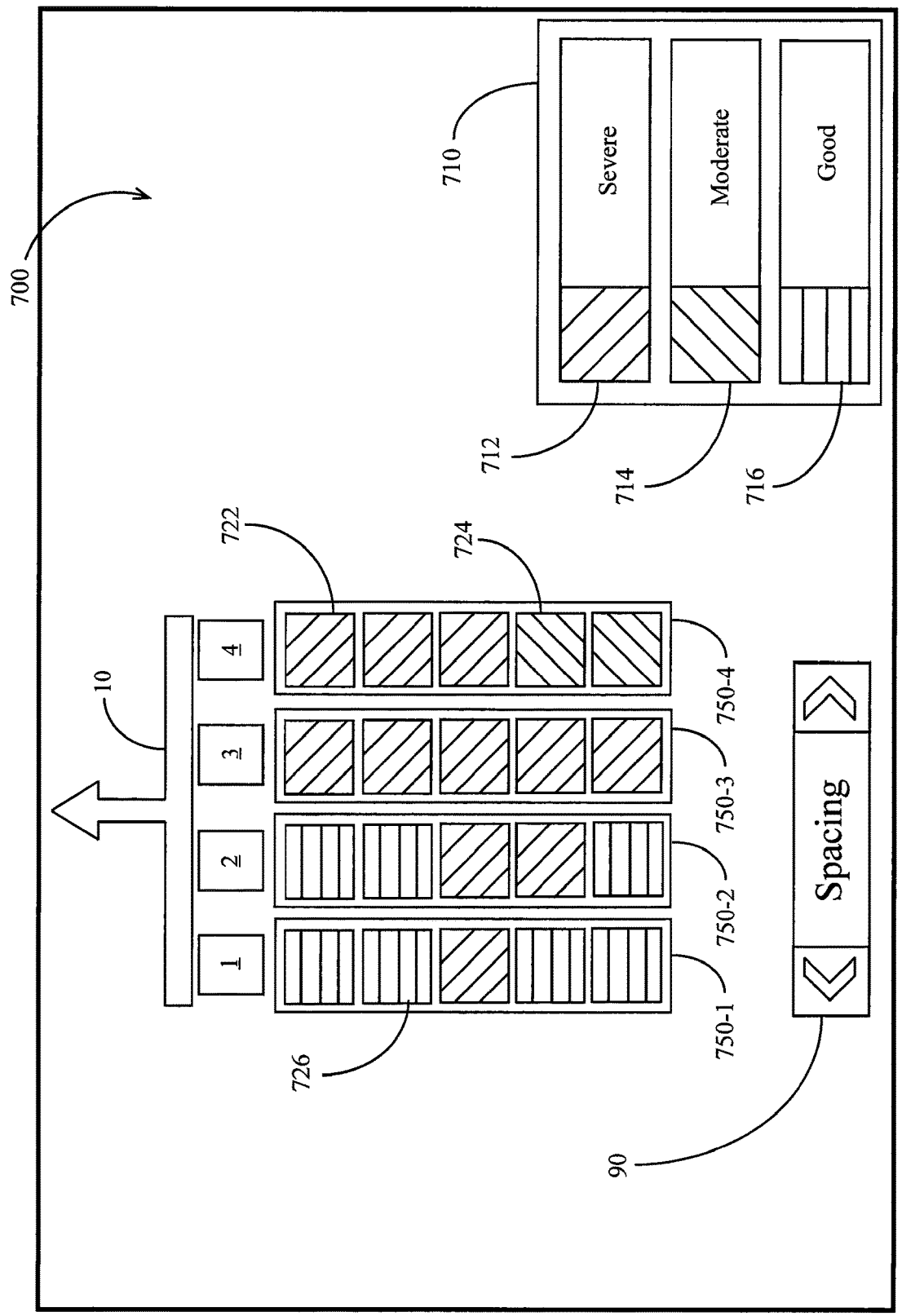
FIG. 7 illustrates an embodiment of a seed spacing map.

The monitor system 100 preferably displays a spacing map 700 as illustrated in FIG. 7. The spacing map 700 preferably includes a schematic representation of the location of planter 10 and its transversely-spaced row units (e.g., row units 1-4). As the planter 10 traverses the field, a spacing map unit 750 (e.g., map unit 750-1) is placed in the location occupied on the map 700 by each row unit 1-4. Each spacing map unit 750 is preferably substantially filled with spacing map blocks (e.g., spacing map block 722). The pattern, symbol or color of each spacing map block corresponds to a legend 710 preferably displayed in the spacing map 700. The legend 710 preferably includes a set of legend ranges (e.g., legend ranges 712, 714, 716) including a pattern, symbol or color and a corresponding range of seed spacing quality, as discussed below. It should be appreciated that the legend ranges 712, 714, 716 correspond to spacing map blocks 722, 724, 726, respectively. Each map unit 750 preferably includes the same total number of map blocks (e.g., five). The number of each type of spacing map block corresponds to the number of spacing errors (or non-errors) associated with the corresponding legend range. For example, three spacing map blocks (including map block 726) categorized as "Good" are included in the spacing map unit 750-1, indicating that approximately 60 percent of the seed spacing within spacing map unit 750-1 is categorized as "Good".

Figure 9:
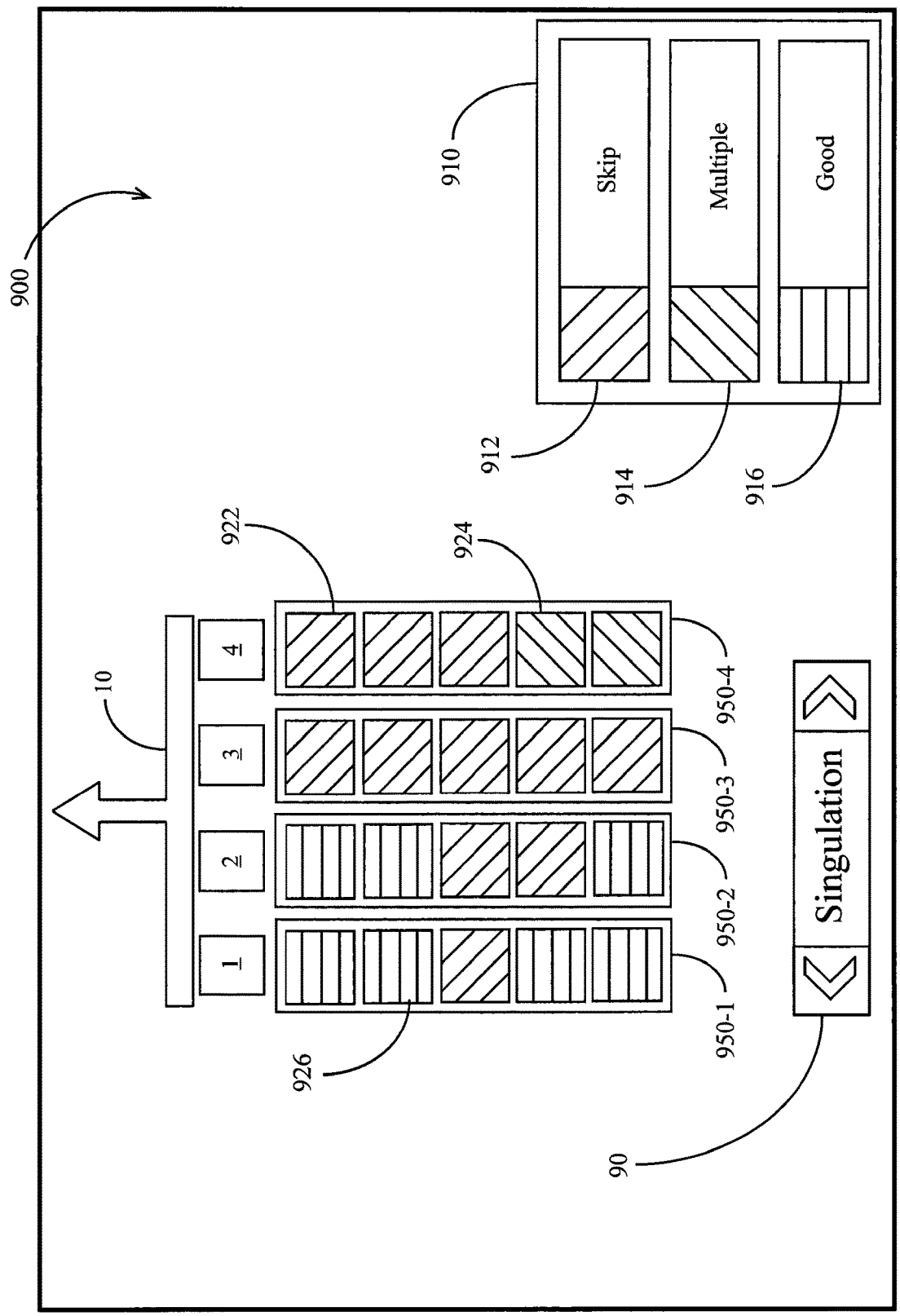
FIG. 9 illustrates an embodiment of a seed singulation map.

The monitor system 100 preferably displays a singulation map 900 as illustrated in FIG. 9. The singulation map 900 preferably includes a schematic representation of the location of planter 10 and its transversely-spaced row units (e.g., row units 1-4). As the planter 10 traverses the field, a singulation map unit 950 (e.g., map unit 950-1) is placed in the location occupied on the map 900 by each row unit 1-4. Each singulation map unit 950 is preferably filled with singulation map blocks (e.g., singulation map block 922). The pattern, symbol or color of each singulation map block corresponds to a legend 910 preferably displayed in the singulation map 900. The legend 910 preferably includes a set of legend ranges (e.g., legend ranges 912, 914, 916) including a pattern, symbol or color and a corresponding range of seed singulation quality, as discussed below. It should be appreciated that the legend ranges 912, 914, 916 correspond to singulation map blocks 922, 924, 926, respectively. Each map unit 950 preferably includes the same total number of map blocks (e.g., five). The number of each type of singulation map block corresponds to the number of singulation errors (or non-errors) associated with the corresponding legend range. For example, four singulation map blocks (including map block 926) categorized as "Good" are included in the singulation map unit 950-1, indicating that approximately 80 percent of the seed singulation within singulation map unit 950-1 is categorized as "Good".

Figure 8:
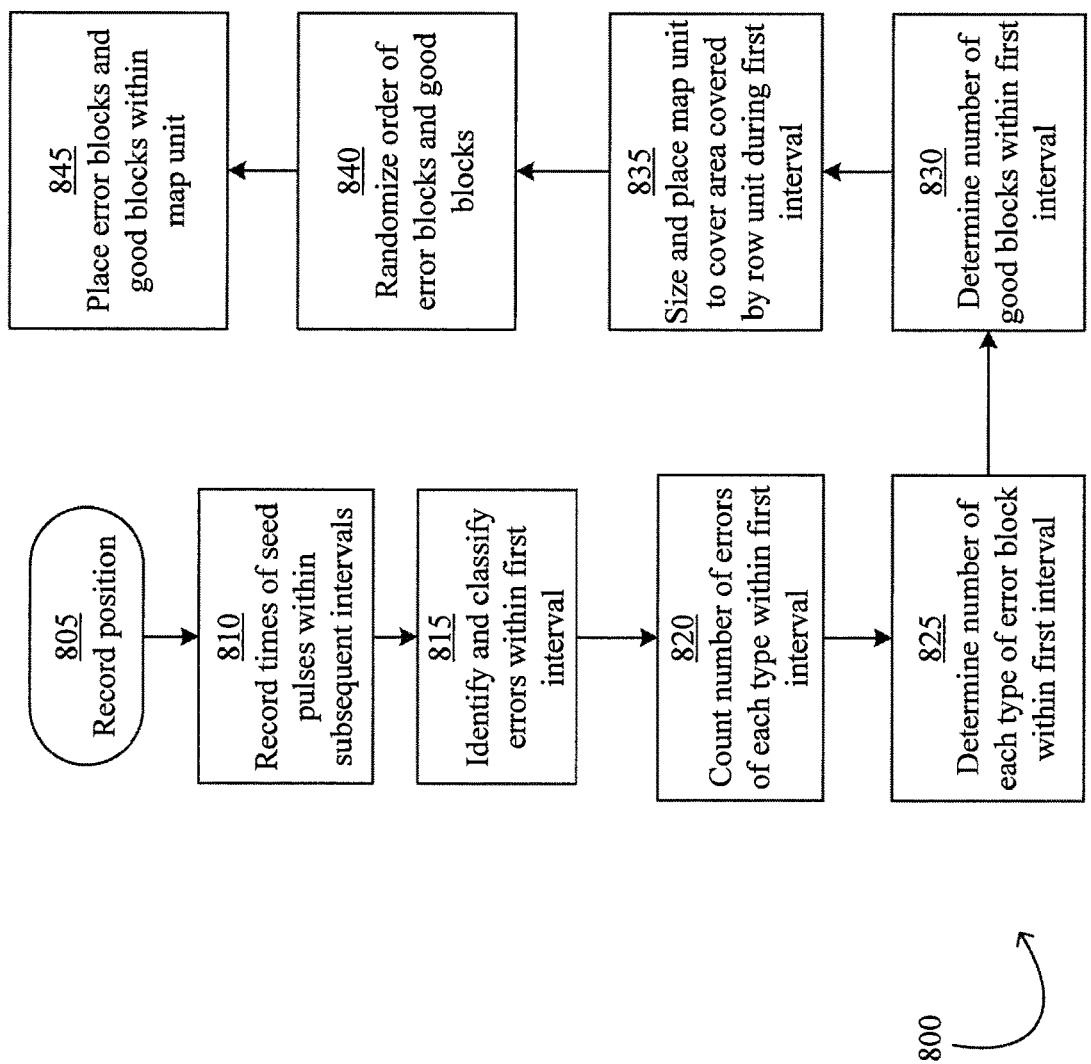
FIG. 8 illustrates an embodiment of a process for generating a planting error map.

The monitor system 100 preferably displays the spacing map 700 and the singulation map 900 according to a process designated generally by reference numeral 800 in FIG. 8. At step 805, the monitor device 110 records the position reported by the GPS receiver 166 and determines the position of each row unit. At step 810, the monitor device 110 records the times of seed pulses within multiple subsequent intervals. At step 815, the monitor device 110 identifies and categorizes errors (e.g., spacing errors and singulation errors) within a first interval. In displaying the spacing map 700, the monitor device 110 preferably identifies spacing errors categorized as "Severe" and "Moderate" according to the method of classifying seeds as "misplaced2" or misplaced4", respectively, as disclosed in Applicant's U.S. patent application Ser. No. 13/292,384 ("the '384 application"), incorporated herein in its entirety by reference. In displaying the singulation map 900, the monitor device 110 preferably identifies singulation errors categorized as "Skips" and "Multiples" according to the method of classifying errors as "Skips" and "Multiples", respectively as disclosed in the '384 application, previously incorporated by reference. At step 820, the monitor device 110 preferably counts the number of errors of each type within the first interval. At step 825, the display device 130 preferably determines the number of each type of error block (e.g., the number of map blocks corresponding to "Skips" or "Multiples" in the singulation map 900 or the number of map blocks corresponding to "Severe" or "Moderate" spacing errors in the spacing map 700. Step 825 is preferably carried out by calculating a percentage of seeds in the first interval to which each error applies and rounding the percentage to a fraction equal to the number of error blocks divided by the total number of blocks in the map unit. For example, in the singulation map 900 of FIG. 9, 18% of the seeds in the interval associated with map unit 950-1 are classified as skips such that one map block out of the five map blocks in the map unit is displayed as a "Skip" error block. At step 830, the display preferably determines the number of "Good" blocks within the first interval by determining the number of blocks not assigned to errors. At step 835, the display device 130 preferably sizes and places the map unit to cover the area traversed by the row unit during the first interval. At step 840, the display device 130 preferably randomizes the order of error blocks and good blocks within the map unit. At step 845, the display device 130 preferably places the error blocks and good blocks within the map unit.

In other embodiments of the process 800, the display device 130 displays a map block corresponding to each seed or to each individual spacing or singulation calculation falling within the map unit.

Figure 10:
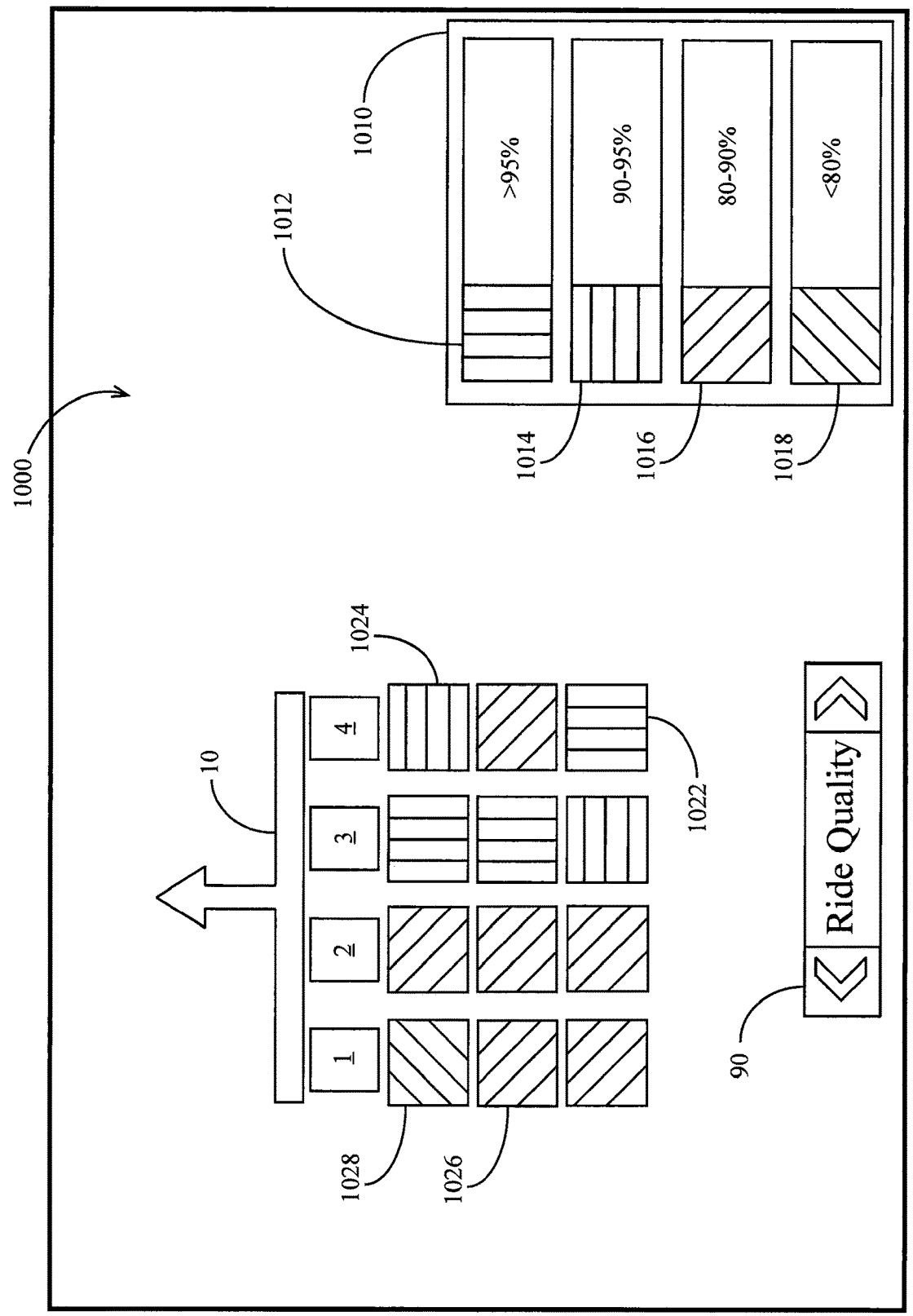
FIG. 10 illustrates an embodiment of a ride quality map.

The monitor system 100 preferably displays a ride quality map 1000 as illustrated in FIG. 10. The ride quality map 1000 preferably includes a schematic representation of the location of planter 10 and its transversely-spaced row units (e.g., row units 1-4). As the planter 10 traverses the field, a map block (e.g., map block 1022) is placed in the location occupied on the map 1000 by each row unit 1-4. The pattern, symbol or color of each map block corresponds to a legend 1010 preferably displayed in the population map 1000. The legend 1010 preferably includes a set of legend ranges (e.g., legend ranges 1012, 1014, 1016, 1018) including a pattern, symbol or color and a corresponding value range. The legend ranges 1012, 1014, 1016, 1018 correspond to ride quality ranges as discussed below. It should be appreciated that the legend ranges 1012, 1014, 1016, 1018 correspond to map blocks 1022, 1024, 1026, 1028, respectively.

Figure 11:
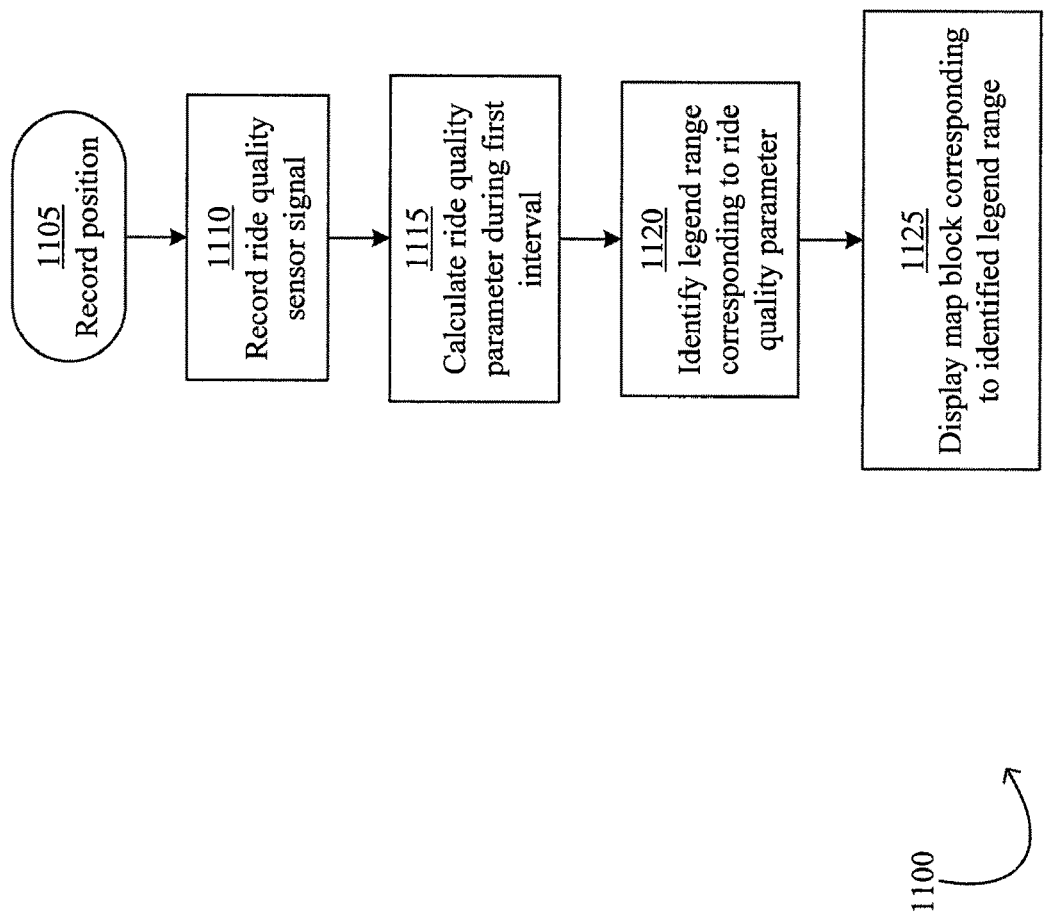
FIG. 11 illustrates an embodiment of a process for generating a ride quality map.

The monitor system 100 preferably displays the ride quality map 1000 according to a process illustrated generally by reference numeral 1100 in FIG. 11. At step 1105, the monitor device 110 records the position reported by the GPS receiver 166 and determines the position of each row unit. At step 1110, the monitor device 110 preferably records the signal generated by the ride quality sensor 164 associated with each row unit. As discussed elsewhere herein, the ride quality sensor 164 preferably comprises an accelerometer disposed to measure the vertical velocity and acceleration of the row unit. At step 1115, the monitor device 110 preferably calculates a ride quality parameter using the values of the ride quality sensor signal during a first interval. In some embodiments the ride quality parameter is preferably calculated according to the following equation:

$$\text{Ride Quality} = \frac{T_L}{T_{INT}} \times 100\%$$

Where:
$T_{INT}$=Total time duration of the interval, and
$T_L$=Time during interval in which vertical velocity is greater than a predefined limit.

In other embodiments, $T_L$ corresponds to the time in which vertical acceleration is greater than a predefined limit. Continuing to refer to FIG. 11, at step 1120 the display device 130 preferably identifies a legend range corresponding to the ride quality parameter calculated for the first interval. At step 1125, the display device 130 preferably displays a map block corresponding to the identified legend range. For example, in FIG. 10 the ride quality at row 4 has been calculated at 92% so that map block 1024 has a pattern corresponding to legend range 1014.

Figure 14:
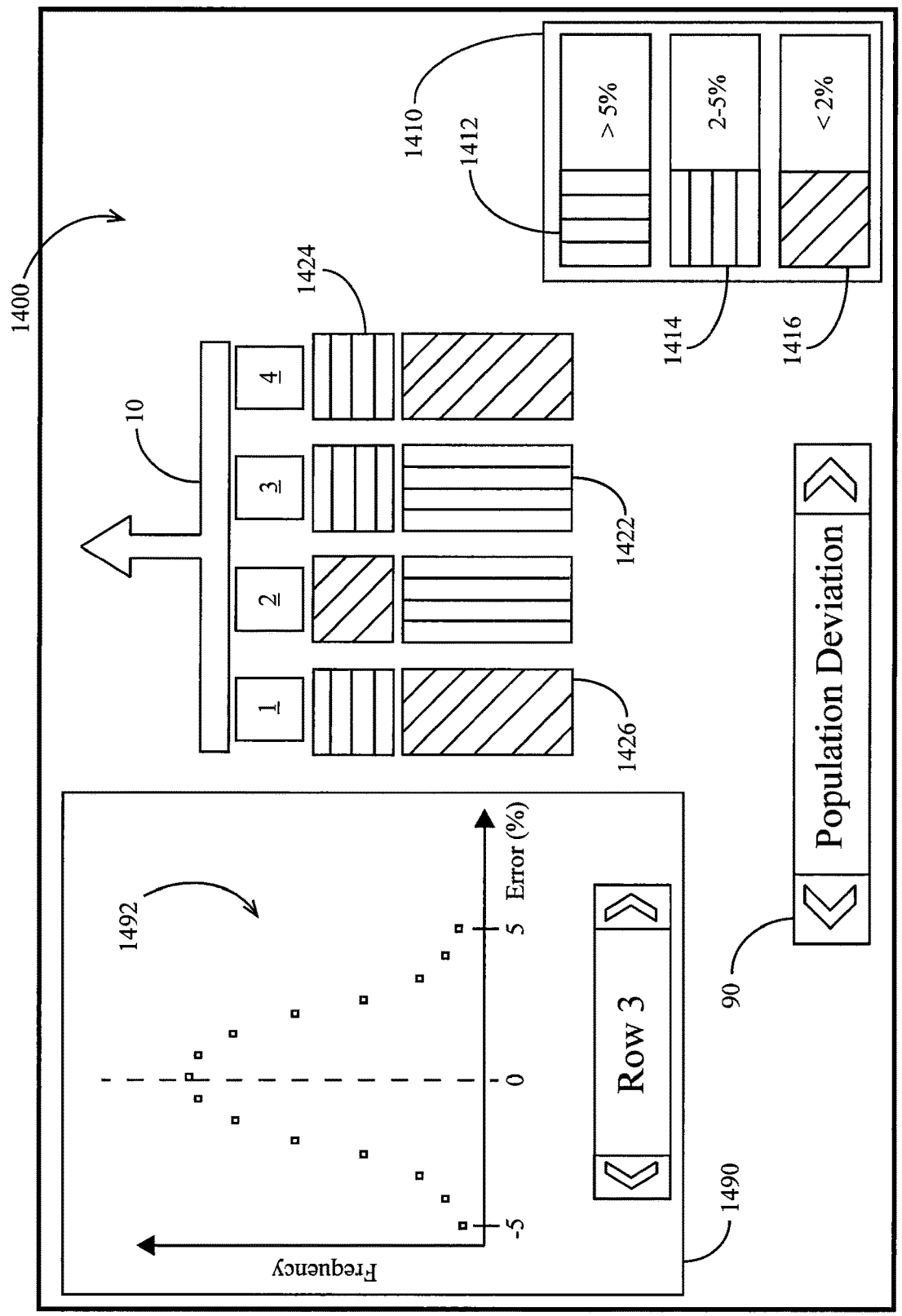
FIG. 14 illustrates an embodiment of a population deviation map.

The monitor system 100 preferably displays a population deviation map 1400 as illustrated in FIG. 14. The population deviation map 1400 preferably includes a schematic representation of the location of planter 10 and its transversely-spaced row units (e.g., row units 1-4). As the planter 10 traverses the field, a map block (e.g., map block 1422) is placed in the location occupied on the map 1400 by each row unit 1-4. The pattern, symbol or color of each map block corresponds to a legend 1410 preferably displayed in the population deviation map 1400. The legend 1410 preferably includes a set of legend ranges (e.g., legend ranges 1412, 1414, 1416) including a pattern, symbol or color and a corresponding value range. The legend ranges 1412, 1414, 1416 correspond to population deviation ranges as discussed below. It should be appreciated that the legend ranges 1412, 1414, 1416 correspond to map blocks 1422, 1424, 1426, respectively. The population deviation map 1400 preferably includes an interface 1490 displaying a histogram 1492 representing the statistical distribution of population deviation for a given row (or multiple rows) over a time interval and allowing the user to select the row for which the histogram 1492 is displayed.

Figure 13:
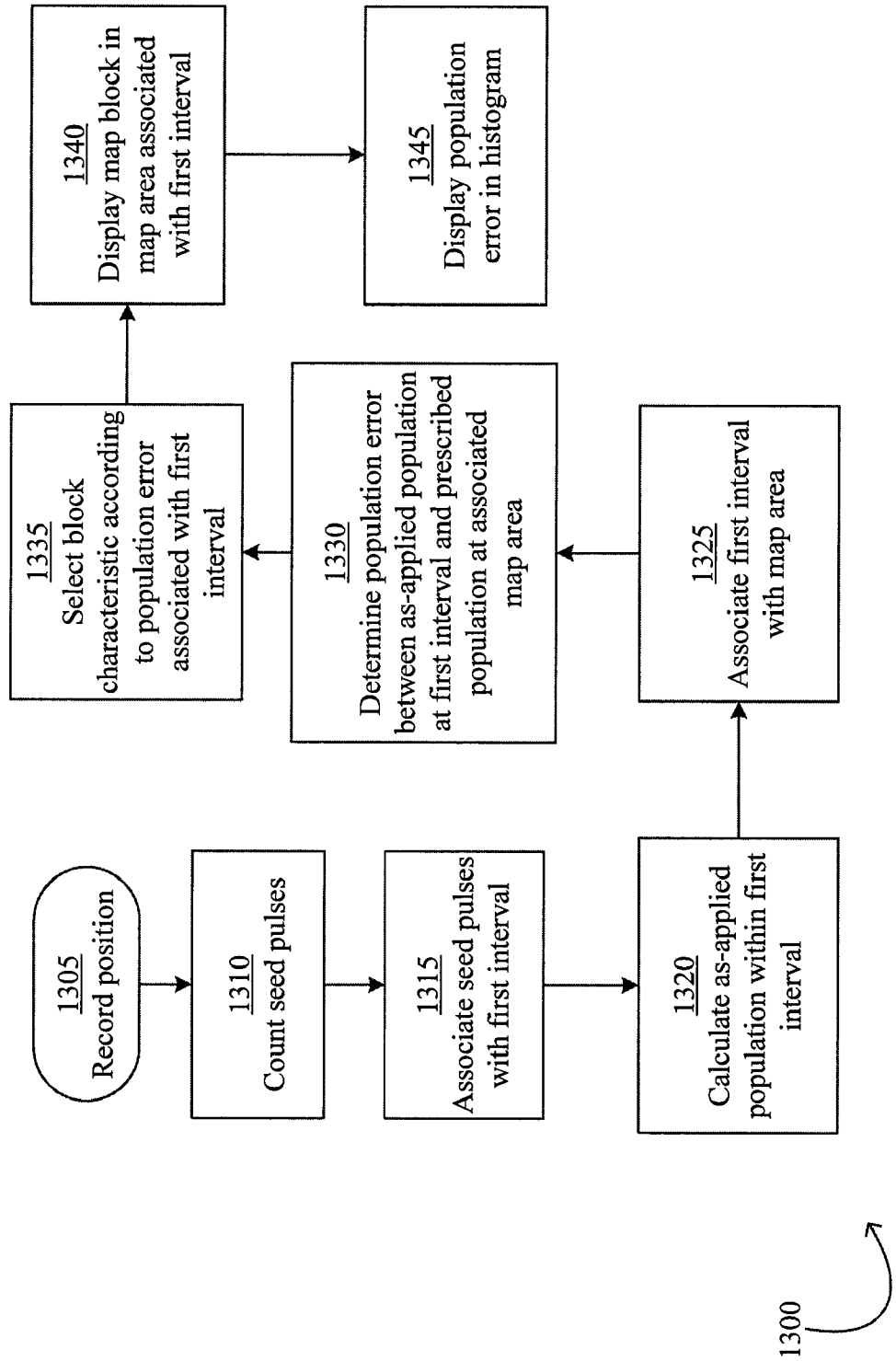
FIG. 13 illustrates an embodiment of a process for generating a population deviation map.

The monitor system 100 preferably displays the population deviation map 1400 according to a process illustrated generally by reference numeral 1300 in FIG. 13. At step 1305, the monitor device 110 records the position reported by the GPS receiver 166 and determines the position of each row unit. At step 1310, the monitor device 110 preferably counts seed pulses from the seed sensor 160 at each row unit. At step 1315, the monitor device 110 preferably associates a seed pulse count with a first interval. At step 1320, the monitor 1320 preferably calculates the population applied in the first interval (e.g., as disclosed herein with respect to process 600 of FIG. 6). At step 1325, the display device 130 preferably associates the first interval with a map area. At step 1330, the display device 130 calculates a population error between the applied population and the prescribed population at the map area associated with the first interval. The population error is preferably calculated using the following equation:

$$\text{Population Error} = \frac{|\text{Prescribed Population} - \text{Applied Population}|}{\text{Prescribed Population}} \times 100\%$$

It should be appreciated that in carrying out step 1330 the display device 130 determines the prescribed population by accessing the prescription data 185 stored in the memory 134. At step 1335, the display device 130 selects a block characteristic (e.g., pattern, symbol or color) by identifying the legend range corresponding to the population error. At step 1340, the display device 130 preferably displays a map block having the selected characteristic in the map area associated with the first interval. For example, in the population deviation map 1400 of FIG. 14, row 4 has planted an interval having 3% population error such that the resulting map block 1424 has a pattern corresponding to legend range 1414. At step 1345, the display device 130 preferably displays a histogram 1492 representing the statistical distribution population error or deviation for a selected row (or multiple rows) over a second interval, which second interval is preferably longer than the first interval.

Linked Mapping Methods

Figure 19:
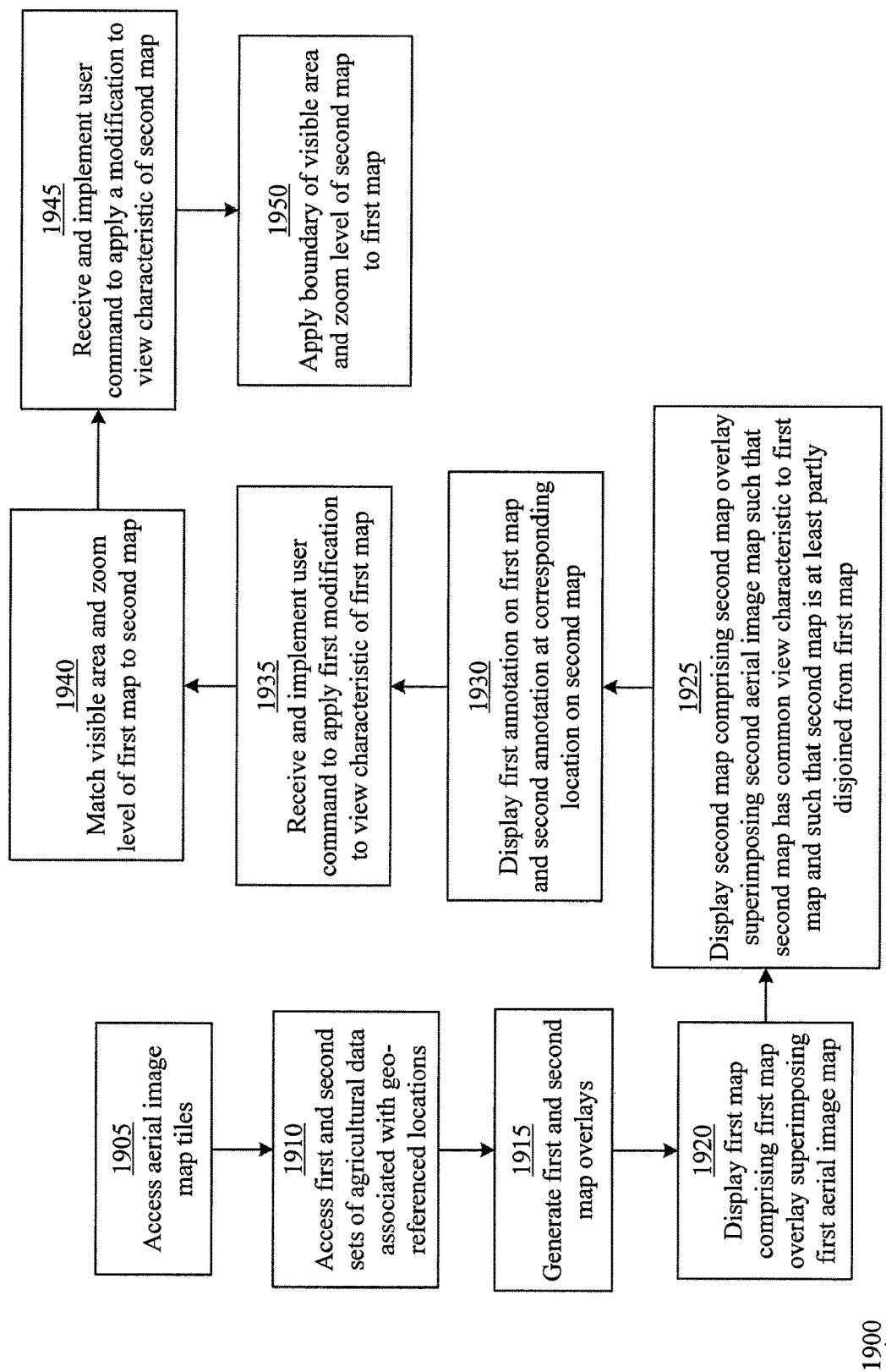
FIG. 19 illustrates an embodiment of a process for displaying agricultural data.

A process for displaying linked maps of agricultural data is illustrated generally by reference numeral 1900 in FIG. 19. At step 1905, the display device 130 preferably accesses aerial image map tiles corresponding to a location. At step 1910, the display device 130 preferably accesses first and second sets of agricultural data. Each set of agricultural data preferably comprises agricultural data associated with geo-referenced locations such that a spatial map may be generated therefrom. At step 1915, the display device 130 preferably generates a first map overlay corresponding to the first set of agricultural data and a second map overlay corresponding to the second set of agricultural data. At step 1920 the display device 130 preferably displays a first map comprising the first map overlay, preferably superimposed over a first aerial image map. At step 1925 the display device 130 preferably displays a second map comprising the second map overlay, preferably superimposed over a second aerial image map. The second map preferably has a view characteristic (e.g., orientation, scale, zoom level or center) equal to the same view characteristic of the first map. The second map preferably has multiple view characteristics equal to the same view characteristics of the first map. The second map is preferably at least partly disjoined from the first map (e.g., the second map may be displayed side-by-side with the first map). At step 1930, the display device 130 preferably displays a first annotation on the first map and a second annotation on the second map. Both the first annotation and second annotation preferably correspond to the same geo-referenced location such that a user may reference the annotation to visually determine corresponding locations on the first and second maps.

Continuing to refer to the process 1900, at step 1935 the display device 130 preferably receives and implements a user command to apply a first modification to a view characteristic of the first map. In some embodiments the user command comprises a manipulation of a user interface displayed on the map (e.g., adjustment of a scale to adjust zoom level). In other embodiments the user command comprises a manipulation of a touch screen of the display (e.g., "pinching" the touch screen to adjust zoom level). At step 1940, upon determining that a modification has been made to the first map, the display device 130 preferably matches the visible area and zoom level of the second map to the visible area and zoom level of the first map. The display device 130 preferably matches the visible area of the second map to the visible area the first map by determining the geo-referenced locations corresponding to a boundary of the first map and then re-drawing the second map such that a boundary of the second map corresponds to the same geo-referenced locations.

In an alternative embodiment of step 1940, the display device 130 applies a second modification to the second map corresponding to the first modification and preferably applies the second modification to the same view characteristic as the first modification. For example, if the first modification comprises rotation of the first map about a first angle, then the second modification preferably comprises rotation of the second map about the first angle.

At step 1945, the display device 130 preferably receives and implements a user command to apply a modification to a view characteristic of the second map. At step 1950, upon determining that a modification has been made to the second map, the display device 130 preferably matches the visible area and zoom level of the first map to the visible area and zoom level of the second map.

Figure 15:
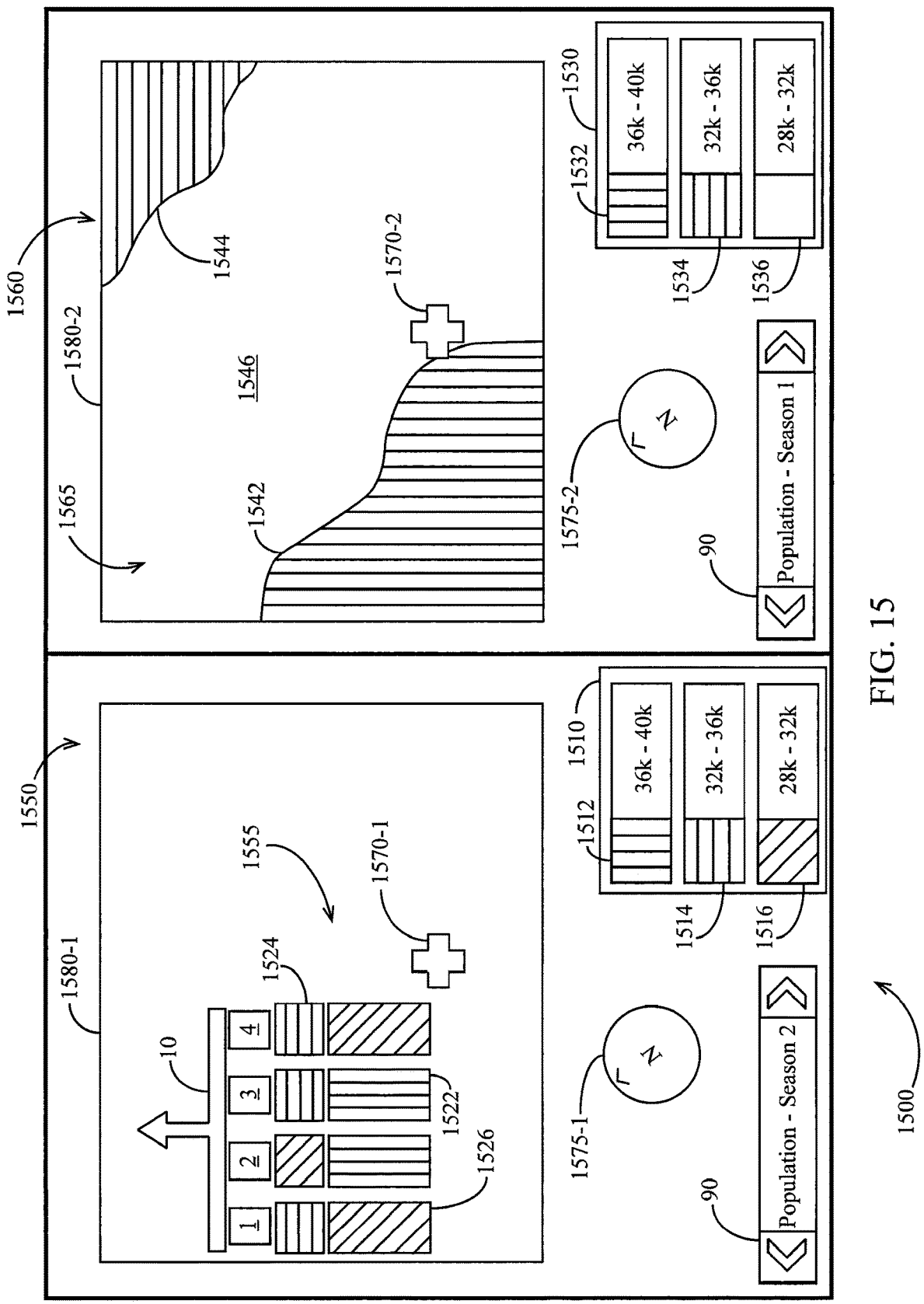
FIG. 15 illustrates an embodiment of a map screen displaying a live planting map and a prior season planting map.

Turning to FIG. 15, a first implementation of the process 1900 is illustrated in a map screen 1500. The map screen 1500 preferably includes a live planting map window 1550 and a prior season planting map window 1560. The live planting map window 1550 preferably displays a map overlay 1555 comprised of map blocks 1522, 1524, 1526 representing live planting data (e.g., population) associated with the location of the block. As the planter traverses the field, an annotation indicating the location of the planter 10 as it traverses the field and a map block (e.g., map block 1524) is placed in the location occupied on the map screen 1500 by each row unit 1-4. The pattern, symbol or color of each map block corresponds to a legend 1510 preferably displayed in the live planting map window 1550. The legend 1510 preferably includes a set of legend ranges (e.g., legend ranges 1512, 1514, 1516) including a pattern, symbol or color and a corresponding value range. The legend ranges 1512, 1514, 1516 correspond to population ranges. It should be appreciated that the legend ranges 1512, 1514, 1516 correspond to map blocks 1522, 1524, 1526, respectively. A boundary 1580-1 preferably defines the extent of the map being displayed. The boundary 1580-1 preferably remains in the same position with respect to the borders of the live planting map window 1550. In some embodiments, the boundary 1580-1 is coextensive with the borders of the live planting map window 1550. An orientation indicator 1575-1 preferably indicates the current orientation of the map layer 1555. When the map layer 1555 is rotated, the orientation indicator 1575-1 preferably updates to display the orientation of the map layer with respect to north. An annotation 1570-1 preferably remains at the same position with respect to the boundary 1580-1 as the map layer 1555 is manipulated.

Continuing to refer to FIG. 15, the prior season planting map window 1560 preferably displays a prior season planting data map overlay 1565 comprised of map polygons 1542, 1544, 1546 representing planting data (e.g., population) from a prior season. The pattern, symbol or color of each map polygon corresponds to a legend 1530 preferably displayed in the prior season planting map window 1560. The legend 1530 preferably includes a set of legend ranges (e.g., legend ranges 1532, 1534, 1536) including a pattern, symbol or color and a corresponding value range. The legend ranges 1512, 1514, 1516 correspond to population ranges. It should be appreciated that the legend ranges 1532, 1534, 1536 correspond to map blocks 1542, 1544, 1546, respectively. A boundary 1580-2 preferably defines the extent of the map being displayed. The boundary 1580-2 preferably remains in the same position with respect to the borders of the live planting map window 1550. In some embodiments the boundary 1580-2 is coextensive with the borders of the live planting map window 1550. The boundaries 1580-1, 1580-2 preferably correspond to the same set of geo-referenced coordinates. An orientation indicator 1575-2 preferably indicates the current orientation of the map layer 1565. When the map layer 1565 is rotated, the orientation indicator 1575-2 preferably updates to display the orientation of the map layer with respect to north. An annotation 1570-2 preferably remains at the same position with respect to the boundary 1580-2 as the map layer 1565 is manipulated. The annotations 1570-1, 1570-2 preferably correspond to the same geo-referenced location (e.g., the same GPS coordinates) such that a user may use the annotations as a point of reference to compare corresponding locations on the map layers 1555, 1565.

Figure 16:
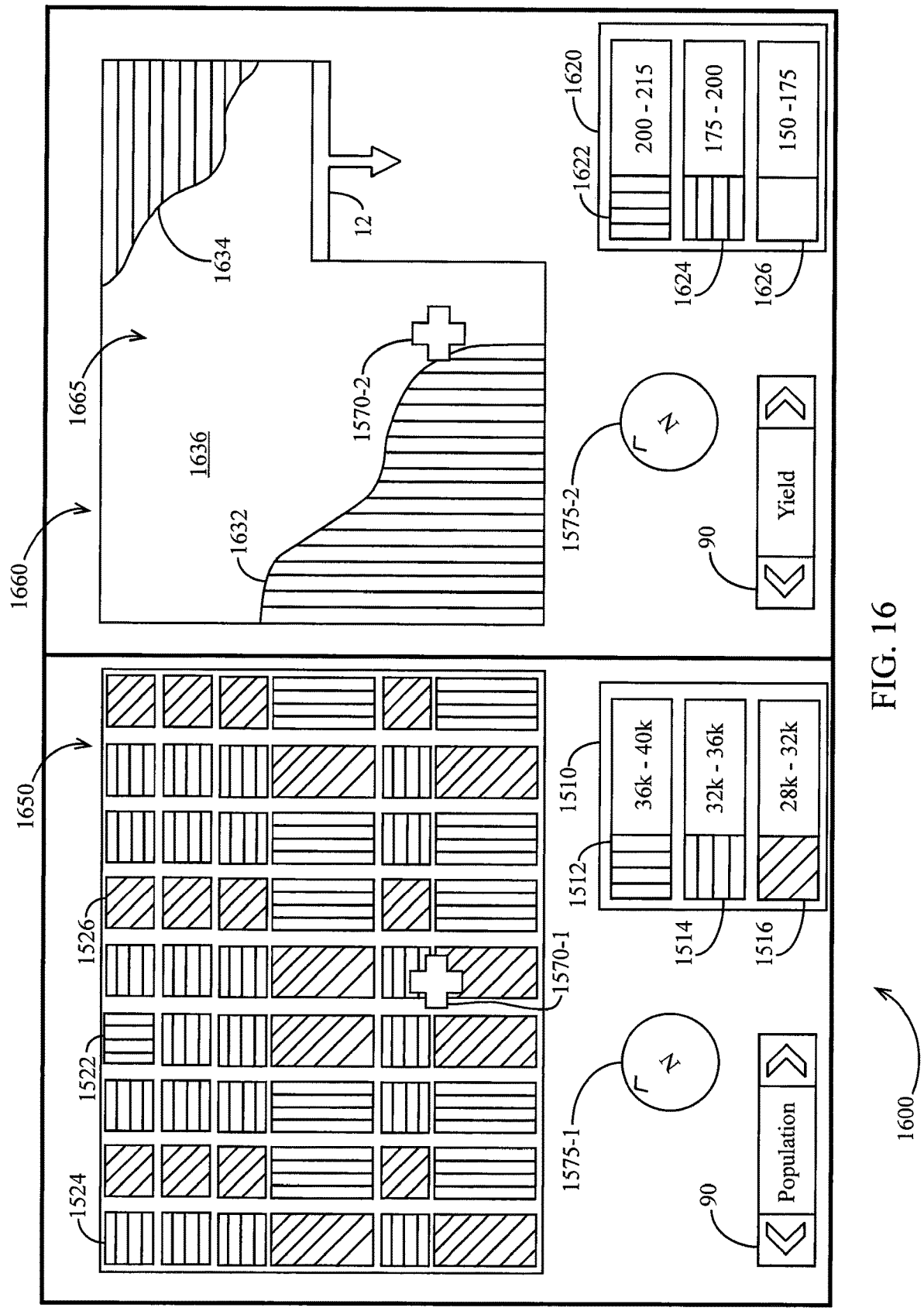
FIG. 16 illustrates an embodiment of a map screen displaying a live yield map and a completed planting map.

Turning to FIG. 16, a second implementation of the process 1900 is illustrated in a map screen 1600. The map screen 1600 preferably includes a completed planting map window 1650 and a live yield map window 1660. The completed planting map window 1650 is preferably similar to the live planting map window of FIG. 15, except that the data has been completed in a prior planting operation and is obtained from a file stored in memory. The live yield map window 1660 preferably includes a map layer 1665 comprising yield map polygons 1632, 1634, 1636 (or blocks similar to those used in the planting maps described herein) corresponding to ranges 1622, 1624, 1626 of a yield legend 1620. As the combine traverses the field, a combine annotation 12 indicates the current location of the combine within the map.

Figure 17:
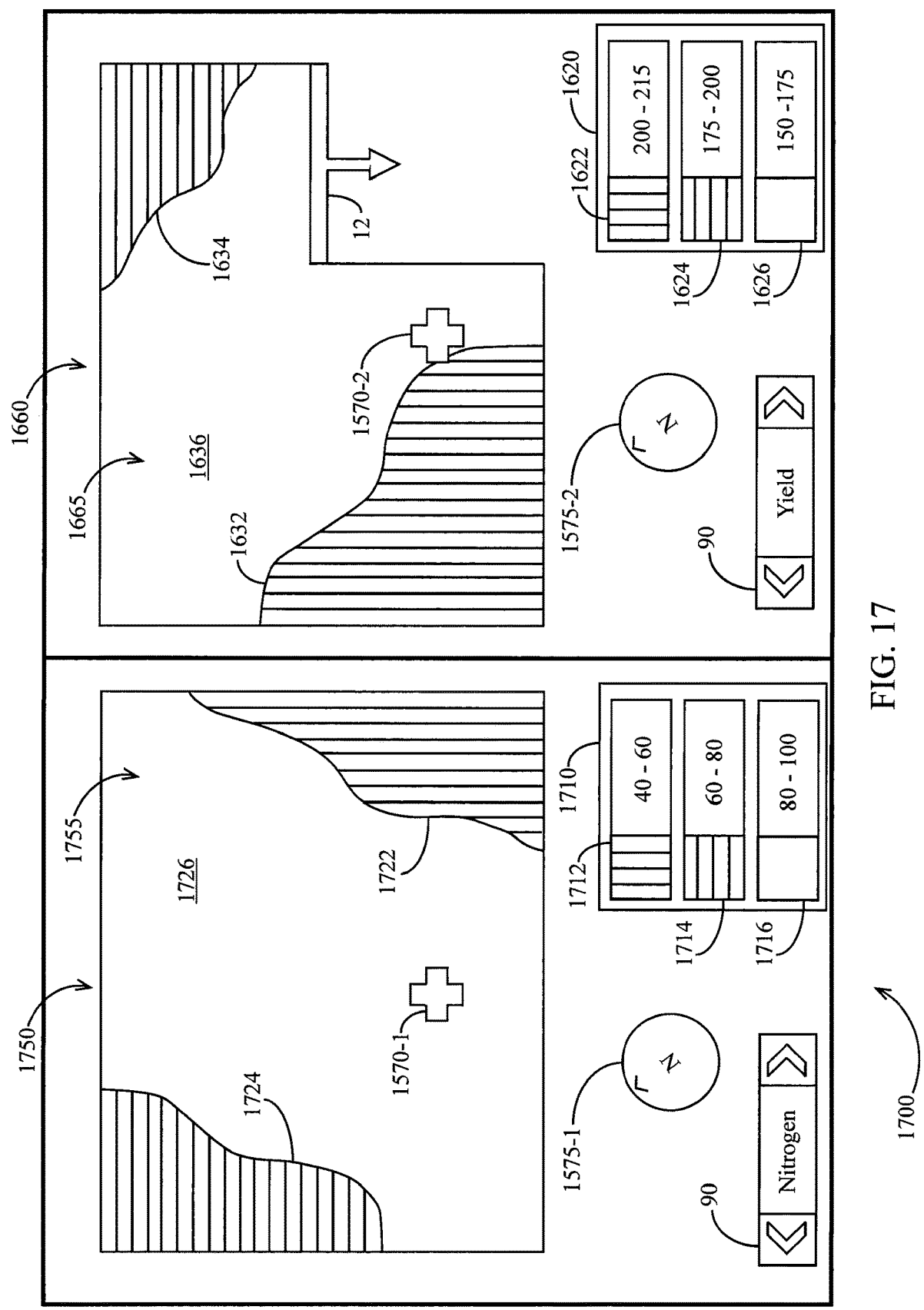
FIG. 17 illustrates an embodiment of a map screen displaying an application rate map and a live yield map.

Turning to FIG. 17, a third implementation of the process 1900 is illustrated in a map screen 1700. The map screen 1700 preferably includes an input application window 1750 and a live yield map window 1660 substantially similar to the live yield map window 1660 in the map screen 1600 of FIG. 16. The input application window 1750 preferably displays a map layer 1755 representing spatially varying rate of application of a crop input; in the illustrated embodiment, the map layer 1755 represents the rate of application of nitrogen. The map layer 1755 preferably comprises a set of application rate polygons 1722, 1724, 1726 corresponding to legend ranges 1712, 1714, 1716 of an application rate legend 1710. The data used to generate the map layer 1755 may be accessed from a memory outside the monitor system 100. For example, nitrogen application rate data may be transferred (e.g., via a portable memory) from a desktop computer used to generate a nitrogen application prescription or a nitrogen application monitor system used to control and record as-applied nitrogen application.

Figure 18:
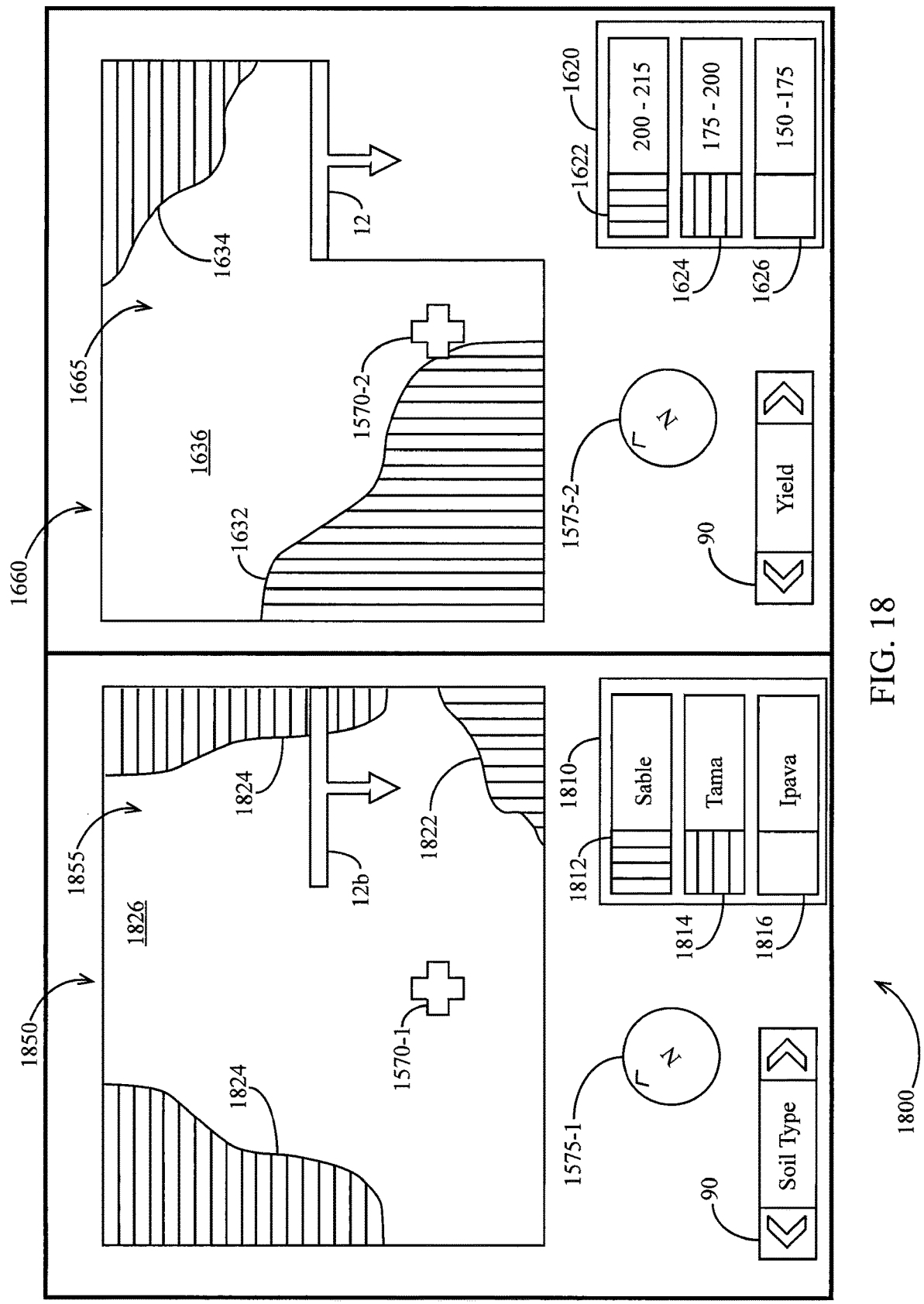
FIG. 18 illustrates an embodiment of a map screen displaying a soil type map and a live yield map.

Turning to FIG. 18, a fourth implementation of the process 1900 is illustrated in a map screen 1800. The map screen 1800 preferably includes a soil type window 1850 and a live yield map window 1660 substantially similar to the live yield map window 1660 in the map screen 1600 of FIG. 16. The soil type window 1850 preferably displays a map layer 1855 representing spatially soil types in the field. The map layer 1855 preferably comprises a set of soil type polygons 1822, 1824, 1826 corresponding to legend ranges 1812, 1814, 1816 of an soil type legend 1810. A combine annotation 12b is preferably displayed in the soil type window 1850; as the combine traverses the field, the display device 130 preferably updates the location of the combine annotation 12b such that the combine annotation 12b is displayed at the location on the map layer 1855 corresponding to the same geo-referenced location as the current location of the combine annotation 12 on the map layer 1665.

Components described herein as being in electrical communication may be in data communication via any suitable device or devices. The term "data communication" as used herein is intended to encompass wireless (e.g., radio-based), electrical, electronic, and other forms of digital or analog data transmission. Components described herein as being in communication via a harness may be in data communication via any suitable device or devices. A harness may comprise a single electrical line or a bundled plurality of electrical lines, and may comprise a point-to-point connection or a bus.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

What is claimed is:

1. A method of monitoring an agricultural implement, comprising:
   as an agricultural implement traverses a field, transmitting command signals to an implement actuator of the agricultural implement, whereby the implement actuator implements operating parameters associated with prescription data for the field;
   receiving, at a monitor device, raw as-applied data from an implement sensor associated with the implement actuator;
   processing, by the monitor device, the raw as-applied data into processed as-applied data;
   transmitting, by the monitor device, authentication data to a communication module;
   comparing, by the communication module, said authentication data to a key stored in memory of said communication module;
   based on the authentication data corresponding to the key, communicating the processed as-applied data from the monitor device to a display device, via the communication module;
   storing, by the display device, the processed as-applied data in a memory;
   rendering, by the display device, a map representing said processed as-applied data, the rendered map including one or more application map images indicative of the processed as-applied data over an image of at least part of the field; and
   displaying, by the display device, said rendered map.

2. The method of claim 1, further comprising:
   modifying prescription data on said display device;
   transmitting said prescription data to said monitor device, via a communication module;
   generating a further command signal with said monitor device, said further command signal being based on said modified prescription data; and
   transmitting said further command signal to the implement actuator of the agricultural implement.

3. The method of claim 2, further comprising: communicating said prescription data between said communication module and said display device based on said authentication data corresponding to said key.

4. The method of claim 3, wherein said display device comprises a multi-function computing device, and
   wherein said display device includes a GPS receiver.

5. The method of claim 2, wherein said raw as-applied data comprises a seed sensor signal; and
   wherein said implement actuator comprises a seed meter drive.

6. The method of claim 1, wherein the agricultural implement is a planter.

7. The method of claim 1, wherein said display device comprises a multi-function computing device.

8. The method of claim 7, wherein said display device includes the memory.

9. The method of claim 1, wherein said raw as-applied data comprises a seed sensor signal; and
   wherein said implement actuator comprises a seed meter drive.

10. The method of claim 1, wherein said rendered map represents a spatial variation in population deviation.

11. The method of claim 1, further comprising displaying, by the display device, the processed as-applied data, the processed as-applied data including a numeric aggregate.

12. The method of claim 11, wherein the numeric aggregate includes a population planted by row unit of the field per interval.

13. The method of claim 1, further comprising:
    counting seed pulses in multiple intervals;
    calculating time between corresponding seed pulses in said multiple intervals;
    determining a row velocity in a first interval of the multiple intervals; and calculating as-applied population within said first interval based on the row velocity.

14. The method of claim 13, further comprising displaying, by the display device, the calculated as-applied population.

15. The method of claim 1, wherein said rendered map represents a spatial variation in one of ride quality, downforce, singulation, spacing, and population deviation.

16. The method of claim 1, further comprising accessing the prescription data from a cloud storage server, prior to transmitting the command signals to the implement actuator; and transmitting the processed as-applied data to the cloud storage server.

17. The method of claim 1, further comprising:

recording times of seed pulses within multiple intervals;

identifying and classifying errors within a first interval of the multiple intervals;

counting a number of errors of each type of error within the first interval;

determining a number of good blocks and a number of error blocks to place within a map unit; and randomizing a spatial order of said good blocks and said error blocks within said map unit.

18. A method of monitoring an agricultural implement, comprising:

as an agricultural implement traverses a field, transmitting command signals to an implement actuator of the agricultural implement, whereby the implement actuator implements operating parameters associated with prescription data for the field;

receiving, at a monitor device, raw as-applied data from an implement sensor associated with the implement actuator;

processing, by the monitor device, the raw as-applied data into processed as-applied data;

storing the processed as-applied data in a memory;

rendering a map representing said processed as-applied data, the rendered map including one or more application map images indicative of the processed as-applied data over an image of at least part of the field, wherein said rendered map represents both spatial variation in ground contact and downforce; and displaying, by a display device, said rendered map.

* * * * *